United States Patent
Takahashi et al.

(10) Patent No.: US 7,842,266 B2
(45) Date of Patent: Nov. 30, 2010

(54) METHOD OF DENITRATION OF EXHAUST GAS AND APPARATUS THEREFOR

(75) Inventors: Youichi Takahashi, Ichihara (JP); Yutaka Tsukui, Ichihara (JP); Nobuyasu Kanda, Tokyo (JP); Kimihiko Sugiura, Tokyo (JP); Shoichi Ibaragi, Ichihara (JP); Toshiharu Inaba, Ichihara (JP)

(73) Assignee: Mitsui Engineering & Shipbuilding Co., Ltd., Tokyo (JP)

( * ) Notice: Subject to any disclaimer, the term of this patent is extended or adjusted under 35 U.S.C. 154(b) by 0 days.

(21) Appl. No.: 12/087,362

(22) PCT Filed: Dec. 28, 2006

(86) PCT No.: PCT/JP2006/326230

§ 371 (c)(1),
(2), (4) Date: Jul. 2, 2008

(87) PCT Pub. No.: WO2007/077919

PCT Pub. Date: Jul. 12, 2007

(65) Prior Publication Data

US 2009/0004082 A1    Jan. 1, 2009

(30) Foreign Application Priority Data

| Jan. 6, 2006 | (JP) | ............................. 2006-001815 |
| Jan. 13, 2006 | (JP) | ............................. 2006-005551 |
| Jan. 18, 2006 | (JP) | ............................. 2006-009768 |
| Apr. 3, 2006 | (JP) | ............................. 2006-102279 |

(51) Int. Cl.
  *B01D 53/56* (2006.01)
  *B01D 53/94* (2006.01)
  *F01N 3/18* (2006.01)
(52) U.S. Cl. .................... 423/212; 422/172; 423/213.2; 423/235; 423/239.1; 423/413
(58) Field of Classification Search ................. 423/210, 423/235, 239, 239.1, 212, 413; 431/5, 159, 431/195; 422/174
See application file for complete search history.

(56) References Cited

U.S. PATENT DOCUMENTS

| 6,247,303 B1 * | 6/2001 | Broer et al. .................... 60/274 |
| 6,258,336 B1 * | 7/2001 | Breen et al. .............. 423/239.1 |
| 2005/0069477 A1 * | 3/2005 | Hong et al. .............. 423/239.1 |

* cited by examiner

*Primary Examiner*—Wayne Langel
*Assistant Examiner*—Syed Iqbal
(74) *Attorney, Agent, or Firm*—Kubovcik & Kubovcik

(57) ABSTRACT

A method of exhaust gas denitration in which nitrogen oxides contained in a low-temperature exhaust gas are removed at a high $NO_x$ removal efficiency. A injection pipe (11) is disposed in a flue (10) for an exhaust gas (x) so that the pipe protrudes from the inner wall of the flue. A hydrocarbon compound (b) and a nitrogen compound (a) are supplied through the injection pipe (11) into the flue (10). The hydrocarbon compound (b) is burned to form a combustion region (s). In this combustion region (s), amine radicals are produced from the nitrogen compound (a). These amine radicals are mixed with nitrogen oxides contained in the exhaust gas (x) to reductively remove the nitrogen oxides.

18 Claims, 17 Drawing Sheets

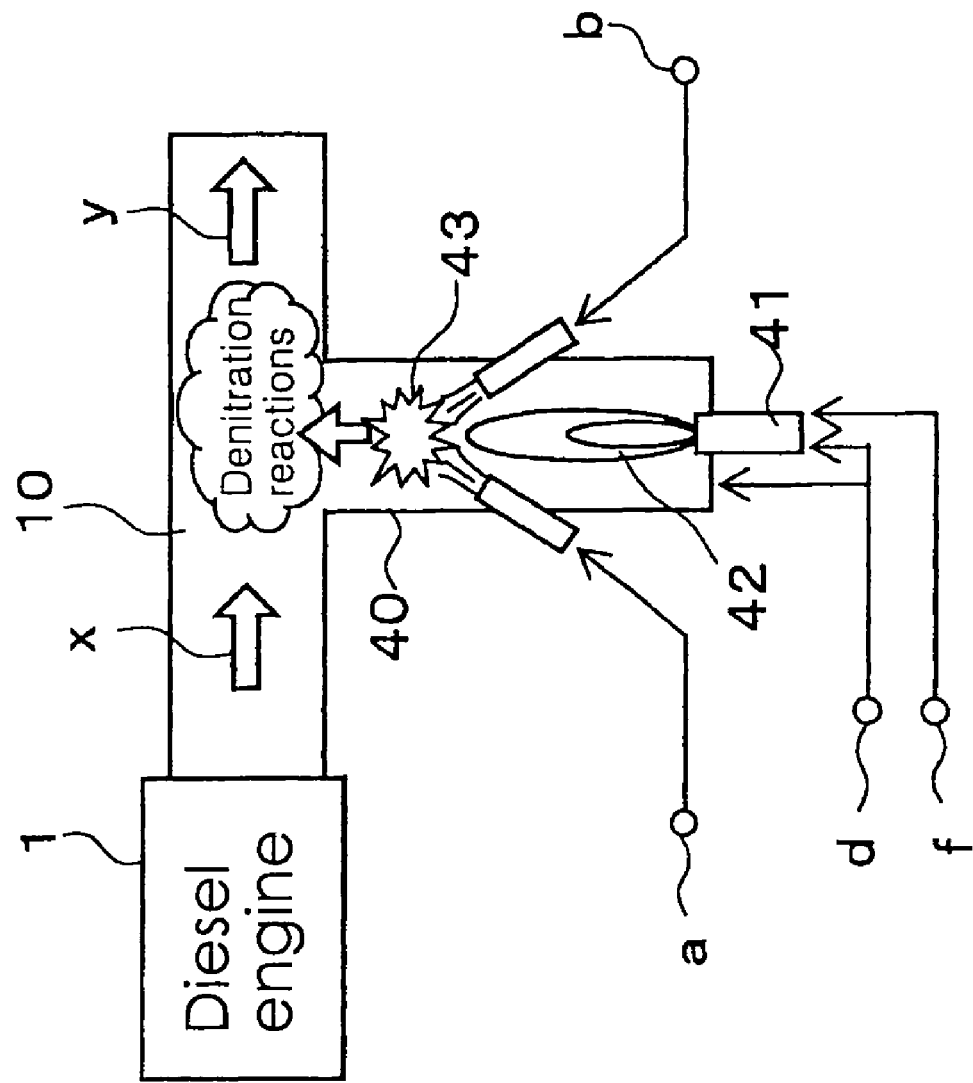

METHOD OF DENITRATION OF EXHAUST GAS AND APPARATUS THEREFOR

This application is a 371 of international application PCT/JP2006/326230 filed Dec. 28, 2006, which claims priority based on Japanese patent application Nos. 2006-001815 filed Jan. 6, 2006; 2006-005551 filed Jan. 13, 2006; 2006-009768 filed Jan. 18, 2006; and 2006-102279 filed Apr. 3, 2006, each of which is incorporated herein by reference.

TECHNICAL FIELD

The present invention relates to a method of denitration of exhaust gas and an apparatus therefor and particularly to a method of denitration of exhaust gas and an apparatus therefor which reductively removes nitrogen oxides in the exhaust gas exhausted from diesel engines and the like for ships and power generation.

BACKGROUND ART

Reduction of particulate matter and nitrogen oxides exhausted from a diesel engine for vehicle such as a bus and truck has drawn a large attention, but elimination of harmful substances in exhaust gas from a diesel engine for ships and power generation, boiler exhaust gas, and plant off-gas is similarly an important problem. However, while the diesel engine for vehicle uses light oil with smaller sulfur contents as fuel, the diesel engine for ships and power generation and the like uses fuel with high sulfur contents such as Bunker A or Bunker C and a large amount of sulfur oxides is contained in the exhaust gas of the diesel engine for ships and power generation and the like, which makes major impediment in removal treatment of harmful substances.

In general, as a denitration method of exhaust gas, a non-catalyst denitration method and a selective catalytic reduction method (SCR method) are known. As the non-catalyst denitration method, a denitration method by a nitrogen reducing agent such as ammonia, urea or the like is widely known, but high activity can not be obtained unless an exhaust gas temperature is as high as 900 to 1000° C. (See Patent Documents 1 and 2, for example). Thus, pretreatment such as heating of the exhaust gas to raise the temperature is needed for the exhaust gas at a relatively low temperature of approximately 250 to 450° C. exhausted from the diesel engine for ships and power generation and the like, which incurs increase in treatment costs and makes application of the non-catalyst denitration method difficult.

With the non-catalyst denitration method using ammonia, a high denitration rate can be obtained on a lab level, but the denitration rate exceeding 50% has been difficult for combustion furnaces such as an actual boiler. For example, non-patent document 1 discloses a denitration method that an ammonia supply amount is divided into pre and post two stages according to a boiler load in a temperature range of 900 to 1050° C. and each of them is supplied in a controlled manner. However, its denitration rate is only approximately 40% under an equimolar condition of nitrogen oxides and ammonia. Moreover, if ammonia is excessively supplied with a purpose of increasing the denitration rate, unreacted ammonia is left, by which the treatment cost is raised. And if the exhaust gas contains sulfur oxides, it generates ammonium sulfate, which requires treatment and deteriorates cost effectiveness.

On the other hand, Patent Document 3 proposes such a method as the SCR method that nitrogen monoxide in the exhaust gas is oxidized into nitrogen dioxide and then, a reducing agent such as ammonia, urea, hydrocarbon or the like is added in presence of SCR catalyst for catalytic reduction. However, the SCR method is poorer in performance than the non-catalyst denitration method in a point that a large amount of SCR catalyst is used and moreover, if the exhaust gas temperature is 300° C. or below, sulfur trioxide or the like generated from oxidation of sulfur dioxide in the exhaust gas reacts with ammonia and generates ammonium hydrogen sulfate to poison the SCR catalyst, by which catalytic activity is lowered. Thus, the SCR method has been used only when the exhaust gas is in a high temperature state of 300° C. or above at which ammonium hydrogen sulfate is decomposed or a sulfur oxidation concentration in the exhaust gas is approximately 1 ppm or less.

Among them, Patent Document 4 proposes a method in which a heating region is formed in a flue through which a low-temperature exhaust gas containing sulfur oxides passes or in a chamber communicating with the flue, amine radicals are generated by blowing nitrogen compounds and hydrocarbons into the heating region, and the nitrogen oxides in the exhaust gas is denitrated by the amine radicals. However, the denitration rate by this denitration method is not necessarily sufficient, and improvement of the denitration rate has been in demand.

Patent Document 1: U.S. Pat. No. 6,066,303
Patent Document 2: Japanese patent application Kokai publication No. 2002-136837
Patent Document 3: Japanese patent application Tokizhyou publication No. 2001-525902
Patent Document 4: Japanese patent application Kokai publication No. 2005-254093
Non-patent Document 1: "Fuel conversion and technology for SOX/NOX measures—mainly on smoke exhaust desulphurization/denitration" by JunpeiAndo, Project News Company, Jun. 25, 1983, pp. 205 to 207

DISCLOSURE OF THE INVENTION

Problems to be Solved by the Invention

The present invention has an object to provide a method of denitration of exhaust gas and an apparatus therefor which removes nitrogen oxides in a low-temperature exhaust gas with a high denitration rate.

Means for Solving the Problem

In order to achieve the above object, the method of denitration of exhaust gas of the present invention is a method of denitration of exhaust gas which reductively removes nitrogen oxide in the exhaust gas, in which a injection pipe projecting into a flue for the exhaust gas is provided, hydrocarbon compound and nitrogen compound are supplied into the flue through the injection pipe, a combustion region for the hydrocarbon compound is formed, amine radicals are generated from the nitrogen compound in the combustion region, and the amine radical and the nitrogen oxide in the exhaust gas are mixed and the nitrogen oxide is denitrated.

Here, a temperature of the combustion region is preferably set at 600 to 1000° C. Also, temperatures of the hydrocarbon compound and nitrogen compound supplied to the process of the denitration treatment is preferably raised in advance by heating means, and the temperature is preferably at 600° C. or above.

Also, treated gas discharged from the process of the denitration treatment is preferably further mixed with amine radicals and denitrated, and the denitration treatment is preferably executed twice or more.

Also, a preliminary process for oxidizing a part of nitrogen monoxide in the exhaust gas supplied to the process of the denitration treatment so as to generate nitrogen dioxide is preferably provided. As the preliminary process, the exhaust gas is preferably given contact treatment with oxidation catalyst or plasma irradiation treatment. The oxidation catalyst is preferably a catalyst in which active metal is carried by a carrier containing titanium and the active metal is at least one selected from vanadium compounds, niobium compounds, molybdenum compounds, and tungsten compounds.

In the preliminary process, hydrocarbon compound with carbon number of 5 or more heated to the temperature of 500 to 700° C. is preferably supplied into a flue of the exhaust gas. The hydrocarbon compound with the carbon number of 5 or more used here preferably has an ignition point at 300° C. or less and is at least one type selected from n-hexane, n-octane, n-dodecane, kerosene, and light oil. In the preliminary process, the nitrogen compound is preferably supplied together with the hydrocarbon compound with the carbon number of 5 or more. In the preliminary process, a preliminary injection pipe projecting into the flue is provided and the hydrocarbon compound with the carbon number of 5 or more or the hydrocarbon compound and nitrogen compound are supplied from a injection port formed in the preliminary injection pipe and moreover, the hydrocarbon compound with the carbon number of 5 or more and nitrogen compound are preferably temperature-controlled by heating means arranged outside the flue of the preliminary injection pipe.

In the preliminary process of the present invention, a ratio Sc/Nc of the oxidation rate Sc of sulfur dioxide to the oxidation rate Nc of nitrogen monoxide is preferably 0.01 to 0.2.

When the hydrocarbon compound and nitrogen compound are heated by the heating means using combustion gas, the combustion gas is preferably supplied into the flue from a combustion gas introduction path integrally attached to the injection pipe so as to maintain the temperature of the hydrocarbon compound and nitrogen compound.

When the hydrocarbon compound and nitrogen compound are heated by the heating means using combustion gas, the combustion gas is preferably supplied to an upstream side of the process of denitration treatment and used for heating of the exhaust gas.

The exhaust-gas denitration apparatus of the present invention in order to achieve the above object is a denitration apparatus that reductively removes nitrogen oxides in the exhaust gas, characterized in that the injection pipe is inserted from radial direction so that an end portion projects from an inner wall of the flue of the exhaust gas, the heating means is arranged outside the flue of the injection pipe, temperatures of the hydrocarbon compound and nitrogen compound are raised by the heating means, the hydrocarbon compound and nitrogen compound are supplied into the flue through a injection port formed in the injection pipe, and the hydrocarbon compound is burned.

The exhaust gas denitration apparatus preferably comprises temperature measuring means of the combustion region in the vicinity of the injection port, flow-rate regulating means for regulating flow rates of the hydrocarbon compound and nitrogen compound into the injection pipe, and control means for controlling the flow-rate regulating means based on the temperature of the combustion region, in which the control means operates the flow-rate regulating means so as to increase the flow rate of the hydrocarbon compound and to decrease the flow rate of the nitrogen compound when the temperature of the combustion region falls below a predetermined temperature. Also, ignition means is preferably provided in the vicinity of the injection port and when the temperature of the combustion region falls below the predetermined temperature, the ignition means is operated by the control means.

Also, when the heating means heats the hydrocarbon compound and nitrogen compound to the predetermined temperature using the combustion gas, the exhaust gas discharged from the heating means is preferably supplied from the combustion gas introduction path integrally attached to the injection pipe into the flue. Here, the injection pipe is preferably constructed by a pipe body and a bulkhead provided in the pipe body, the injection port is provided at one of pipe walls partitioned by the bulkhead, and a combustion gas injection nozzle is formed penetrating the bulkhead and the pipe walls. Alternatively, it is preferable that the injection pipe is made by an outer pipe and an inner pipe, the hydrocarbon compound and nitrogen compound are introduced into the inner pipe, the combustion gas is introduced between the outer pipe and the inner pipe, and a injection nozzle is formed as the injection port penetrating the inner pipe and the outer pipe.

When the heating means heats the hydrocarbon compound and nitrogen compound by the combustion gas to the predetermined temperature, a combustion gas supply portion is preferably provided for supplying the combustion gas discharged from the heating means to an upstream side of the injection pipe of the flue.

In the exhaust gas denitration apparatus, the injection pipe is preferably provided in a comb state in the flue or in a concentric annular shape in the flue.

ADVANTAGES OF THE INVENTION

According to the present invention, a injection pipe is provided projecting from an inner wall in a flue of exhaust gas, hydrocarbon compound and nitrogen compound are supplied into the flue from the injection pipe, the hydrocarbon compound is burned to form a combustion region and amine radicals can be efficiently generated from the nitrogen compound in the combustion region. Thus, the amine radicals and nitrogen oxides in the exhaust gas are mixed, and the nitrogen oxide can be reductively decomposed and removed. The temperatures of the hydrocarbon compound and nitrogen compound supplied to the injection pipe are preferably raised in advance to a predetermined temperature or preferably 600° C. or above so that the combustion region of the hydrocarbon compound can be stably formed. The temperature of the combustion region is preferably 600 to 1000° C. so that generation of hydroxyradical from the hydrocarbon compound and generation of amine radicals from nitrogen oxides can be promoted efficiently.

By carrying out denitration treatment at least once in which the amine radicals are mixed in the treated gas discharged from the process of the above denitration treatment, the denitration rate of the exhaust gas can be further improved.

Moreover, by providing a preliminary process that part of nitrogen monoxide, which is the nitrogen oxide in the exhaust gas, is given oxidation treatment into nitrogen dioxide on the upstream side of the denitration treatment process, a proportion of the nitrogen dioxide with higher reactivity is increased, and the nitrogen oxides can be reductively removed easily in the denitration treatment process. Therefore, even if the exhaust gas temperature is low, a synergetic effect of improved reactivity of the nitrogen oxides and action of amine radicals with higher reactivity can be obtained, by which final denitration rate can be improved much further.

The oxidation treatment of the preliminary process is preferably plasma irradiation treatment, contact treatment with oxidation catalyst or contact treatment with hydrocarbon compounds with the carbon number of 5 or more at a temperature of 500 to 700° C. so that nitrogen monoxide can be efficiently oxidized into nitrogen dioxide and oxidation of sulfur dioxide in the exhaust gas can be restricted.

BRIEF DESCRIPTION OF THE DRAWINGS

FIG. 19 is an explanatory diagram illustrating an outline of a test apparatus used in a comparative example.

BEST MODE FOR CARRYING OUT THE INVENTION

A denitration method of exhaust gas of the present invention and configuration of the apparatus will be described below in detail referring to the attached drawings.

Figure 1:
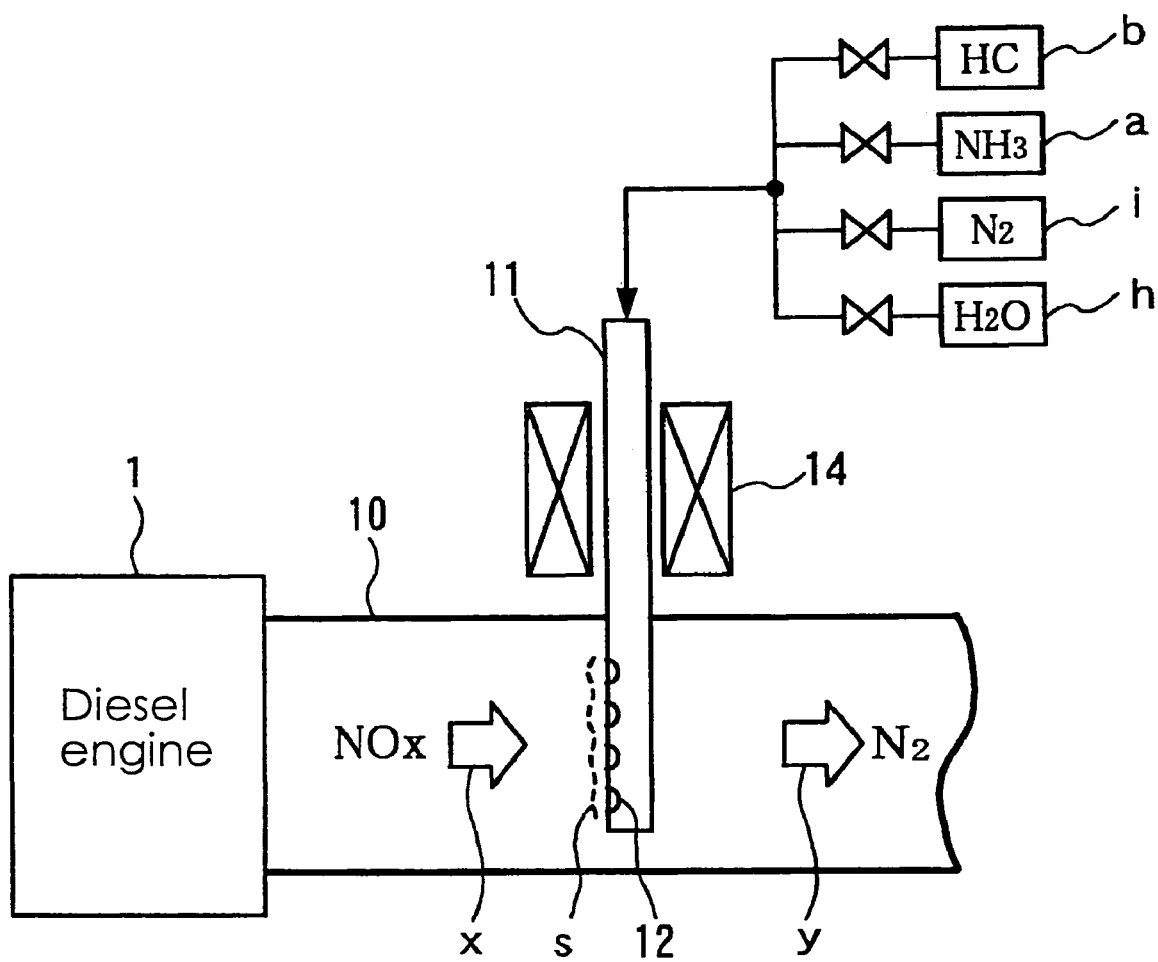
FIG. 1 is an explanatory diagram exemplifying configuration of an exhaust gas denitration apparatus of the present invention.

In FIG. 1, in the exhaust gas denitration apparatus, an exhaust gas (x) from a diesel engine 1 flows through a flue 10, a injection pipe 11 is inserted into the flue 10 from radial direction so that its end portion projects from an inner wall of the flue 10, and heating means 14 is arranged outside the flue 10 of the injection pipe 11. Hydrocarbon compound (b) and nitrogen compound (a) are introduced into piping communicating with the injection pipe 11 and their temperatures are raised to predetermined temperatures by heating means 14 and then, supplied into the flue 10 through a injection port 12 formed at the injection pipe 11. The hydrocarbon compound (b) is brought into contact with oxygen in the exhaust gas (x) and spontaneously ignites and forms a combustion region (s) in the vicinity of the injection port 12.

In the combustion region (s), the hydrocarbon compound (b) is burned and generates hydroxyradical (OH*) at a high temperature. This hydroxyradical acts on the nitrogen compound (a) and generates amine radical ($NH_2$*), which is a reductive gas. By contact between the amine radical and nitrogen oxide (NOx) in the exhaust gas (x), the nitrogen oxide is reductively decomposed and removed. In this way, the exhaust gas (x) is discharged as treated gas (y) obtained by reductively decomposing the nitrogen oxide by the denitration treatment.

Since the combustion region (s) is formed in the flue 10 as above and the nitrogen compound (a) and hydrocarbon compound (b) are supplied into the region, hydroxyradical and amine radical are efficiently generated and thus, the denitration rate to reductively decompose the nitrogen oxide in the exhaust gas is improved and little nitrogen compound (a) remains in the exhaust gas in an unreacted state.

In the method of denitration of exhaust gas of the present invention, the injection pipe 11 projecting into the flue 10 of the exhaust gas (x) is provided, the hydrocarbon compound (b) and the nitrogen compound (a) are supplied into the flue 10 through the injection pipe 11, the combustion region (s) for the hydrocarbon compound (b) is formed, the amine radical is generated from the nitrogen compound (a) in the combustion region (s), and the amine radical and the nitrogen oxide in the exhaust gas (x) are mixed and denitrated.

The nitrogen compound (a) and the hydrocarbon compound (b) supplied to the process of denitration treatment are adjusted in each concentration by nitrogen (i) and/or steam (h) and introduced into the piping communicating with the injection pipe 11 and their temperatures are raised in advance by the heating means 14 to a predetermined temperature. The temperatures of the nitrogen compound (a) and the hydrocarbon compound (b) are preferably 600° C. or more, more preferably 700 to 1000° C., and further preferably 800 to 900° C. By setting such temperature ranges for the nitrogen compound (a) and the hydrocarbon compound (b), the hydrocarbon compound (b) spontaneously ignites and easily generates hydroxyradical, while the nitrogen compound (a) easily generates amine radical, which is a reductive gas.

The temperature of the combustion region (s) is not particularly limited as long as the combustion state is maintained, but it is preferably 600 to 1000° C., or more preferably 700 to 1000° C. By setting such a temperature range for the combustion region (s), the combustion state of the hydrocarbon compound (b) can be easily maintained and amine radical can be efficiently generated.

Figure 2:
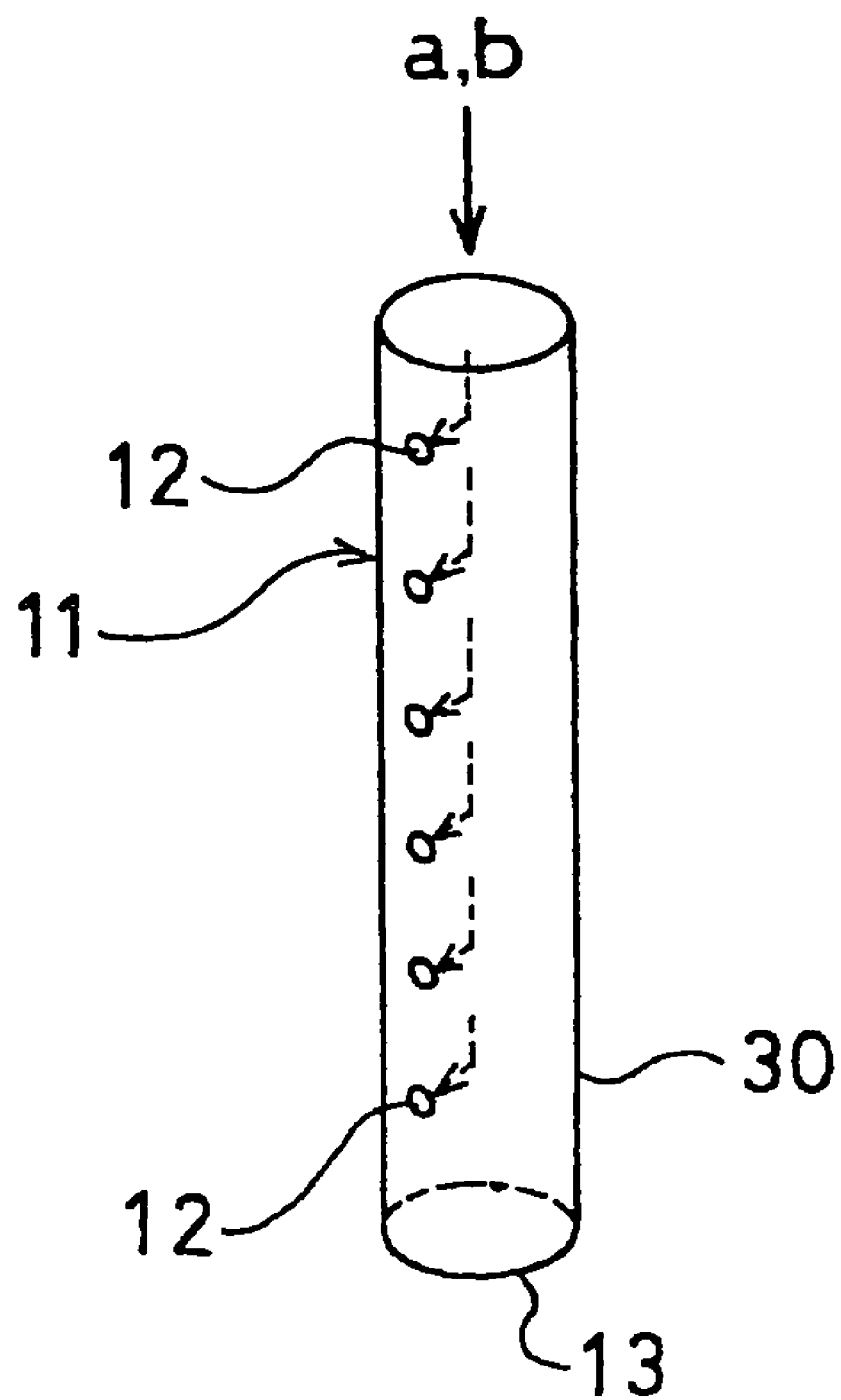
FIG. 2 is an explanatory diagram illustrating an example of configuration of a injection pipe used in the present invention.

The injection pipe 11 is, as shown in FIG. 2, made of a pipe body 30 with an end portion 13 closed and has injection ports 12 provided on the side face on the upstream side of the flue. The injection ports 12 are formed as a plurality of through holes on the side face on the upstream side of the flue of the injection pipe 11. The size and the number of the injection port 12 are not particularly limited but the diameter of the injection port 12 is preferably 1/10 to 1/2 of an inner diameter of the injection pipe 11. By setting the diameter of the injection port 12 in this range, a ratio between a gas flow velocity from the injection port 12 and a gas flow velocity of the flue 10 can be adjusted so that the nitrogen oxide can be reductively decomposed efficiently. The number of the injection ports 12 is preferably 4 to 30 per injection pipe 11. By setting the number of injection ports 12 in this range, a mixing ratio between the exhaust gas and the gas component to be supplied can be adjusted so that the nitrogen oxide can be reductively decomposed efficiently.

The arrangement height of the injection port 12 can be arbitrarily set with respect to the inner diameter of the flue. That is because supply amounts of the nitrogen compound (a) and the hydrocarbon compound (b) and distribution of the supply amounts in the height direction are changed according to the arrangement height of the injection port 12. That is, more injection ports 12 may be formed in the vicinity of the center axis of the flue or more injection ports 12 may be formed in the vicinity of the wall face of the flue. Alternatively, a plurality of types of injection pipes 11 with different distribution of formation positions of the injection ports 12 may be used at the same time.

The heating means 14 is not particularly limited as long as it can heat the nitrogen compound (a) and the hydrocarbon compound (b) flowing in the injection pipe 11 and raise their temperatures to a predetermined temperature, but electric heater, heat exchanger or heater by combustion gas can be exemplified.

In the present invention, the nitrogen compound (a) may be anything that generates amine radical, and other than ammonia shown in the figure, urea, cyanuric acid, amines, nitryls and the like are exemplified and among them, ammonia, urea, cyanuric acid are particularly preferable.

The hydrocarbon compound (b) may be anything that generates hydroxyradical at a high temperature, and methane, propane, butane, light oil, gasoline and the like are exemplified. Moreover, hydrocarbon compounds with the carbon number of 5 or more such as pentane or hexane, for example, may be used. The ignition point of the hydrocarbon compound (b) is preferably in a range of 300 to 700° C., or more preferably 400 to 500° C. The ignition point here refers to a temperature specified in DIN-51794.

The concentration of the hydrocarbon compound (b) supplied from the injection port 12 is preferably in a range of 0.5 to 30 volume %, or more preferably 1 to 15 volume %. If the concentration of the hydrocarbon compound (b) is less than 0.5 volume %, spontaneous ignition becomes difficult and efficiency generating hydroxyradical and generating amine radical from the nitrogen compound (a) is lowered, while if 30 volume % is exceeded, side reaction (incomplete combustion, partial oxidation) other than combustion easily occurs due to a relation with the oxygen concentration in the exhaust gas, and efficiency generating hydroxyradical and generating amine radical from the nitrogen compound (a) is also lowered in this case, which is not preferable.

The concentration of the nitrogen compound (a) is preferably in a range of 0.2 to 30 volume %, or more preferably 1 to 15 volume %. If the concentration of the nitrogen compound is less than 0.2 volume %, amine radical can not be effectively generated, and the denitration rate of the nitrogen compound in the exhaust gas can not be improved, while if 30 volume % is exceeded, a proportion of the nitrogen compound remaining in the exhaust gas is increased, which is not preferable.

With regard to the supply amount of the nitrogen compound (a), a molar ratio between the nitrogen compound/ nitrogen oxide is preferably 0.5 to 1.5, or more preferably 0.7 to 1.3 in a relation with the flow rate of the nitrogen oxide in the exhaust gas. If the molar ratio is less than 0.5, reactivity between the generated amine radical and the nitrogen oxide is lowered, while if the molar ratio exceeds 1.5, a proportion of the nitrogen compound which is not reacted with the nitrogen oxide and remains is increased, either of which is not preferable.

With regard to a relation between the supply amount of the hydrocarbon compound (b) and the supply amount of the nitrogen compound (a), the molar ratio between the hydrocarbon compound (b)/nitrogen compound (a) is preferably 0.5 to 1.5, or more preferably 0.7 to 1.3. If the molar ratio is less than 0.5, hydroxyradical can not be effectively generated and generation of amine radical is decreased, while if the molar ratio exceeds 1.5, a proportion of the unreacted hydrocarbon compound remaining in the exhaust gas is increased, either of which is not preferable.

Figure 3:
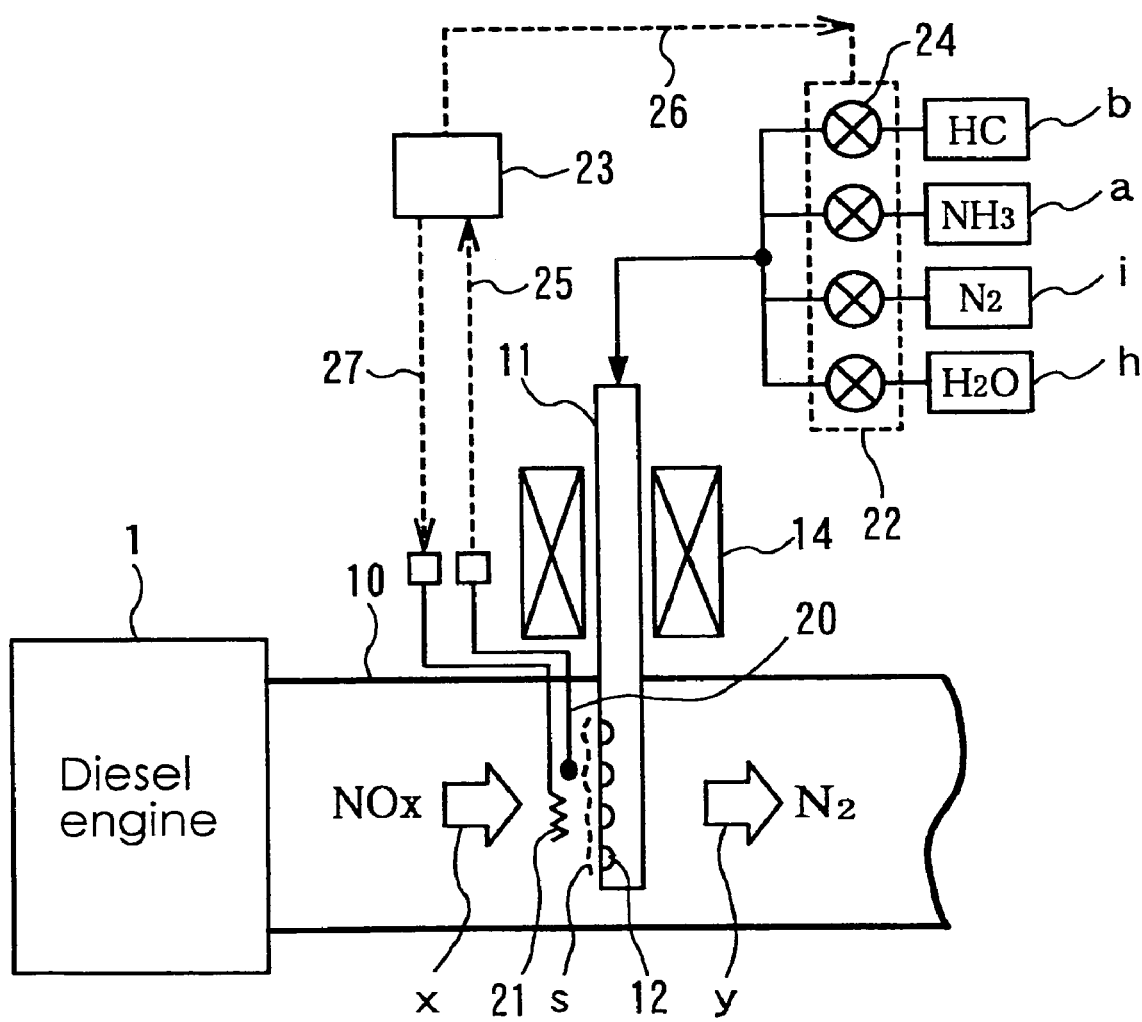
FIG. 3 is an explanatory diagram exemplifying another configuration of the exhaust gas denitration apparatus of the present invention.

FIG. 3 is an explanatory diagram illustrating another example of configuration of the exhaust gas denitration apparatus of the present invention.

In the exhaust gas denitration apparatus of the present invention, if the flow rate or temperature of the exhaust gas (x) in the flue 10 is largely changed, the combustion region (s) is lost and there is a fear that denitration reaction does not progress sufficiently. Thus, in order to maintain the combustion region (s) stably and to realize assured denitration treatment, temperature measuring means 20 for the combustion region (s) is provided in the vicinity of the injection port 12 of the injection pipe 11, and flow-rate regulating means 22 for regulating flow rates of the hydrocarbon compound (b) and nitrogen compound (a) and control means 23 for controlling the flow-rate regulating means 22 from the temperature of the combustion region (s) measured by the temperature measuring means 20 are preferably provided in the piping communicating with the injection pipe 11.

Figure 4:
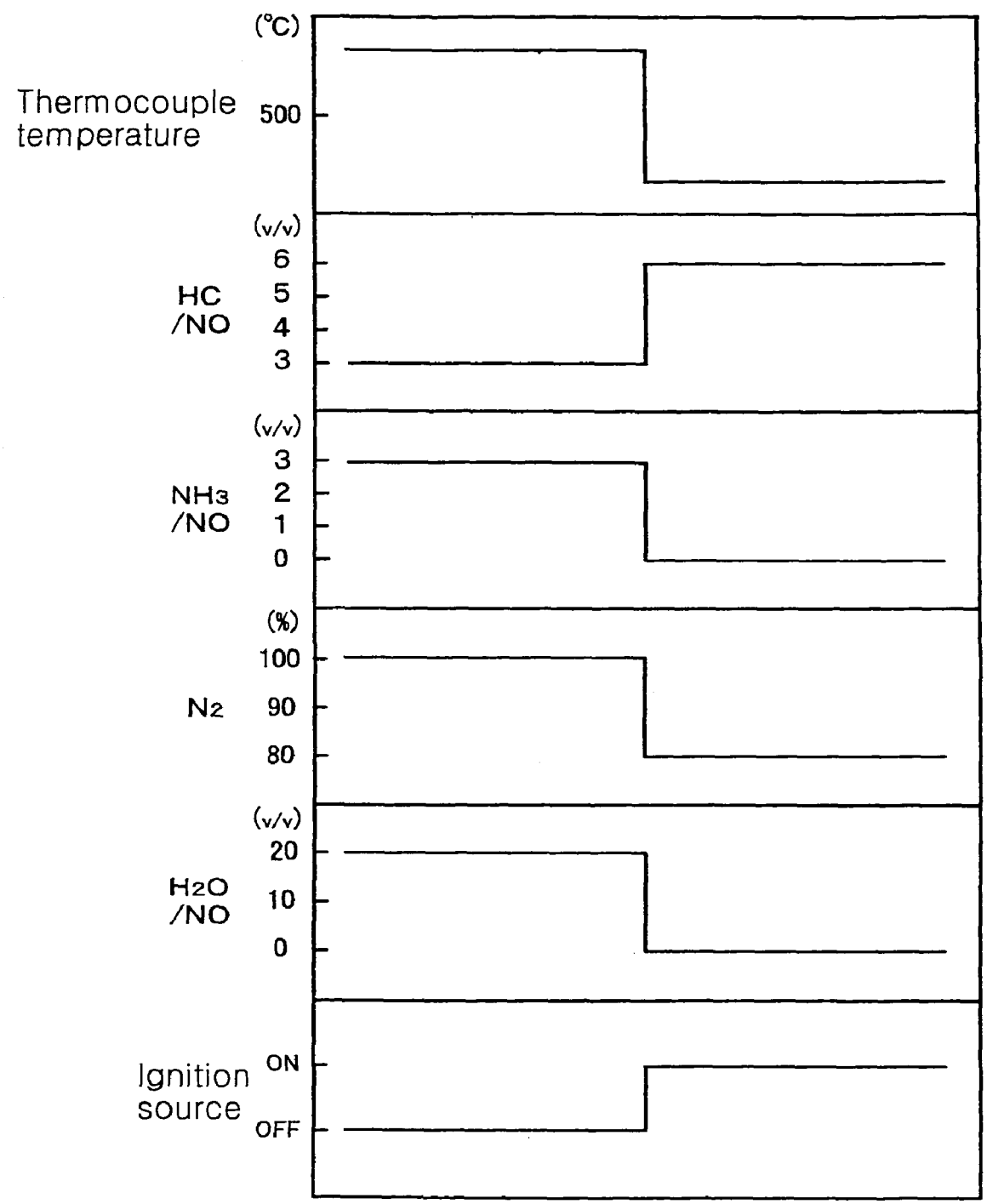
FIG. 4 is an explanatory diagram illustrating an example of a sequence of control means used in the exhaust gas denitration apparatus of the present invention.

When the temperature of the combustion region (s) falls below a predetermined temperature, the control means 23 operates the flow-rate regulating means 22 so as to increase the flow rate of the hydrocarbon compound (b) and to decrease the flow rate of the nitrogen compound (a), the concentration of the hydrocarbon compound (b) can be increased and the combustion region can be maintained. The flow-rate regulating means 22 is made by a plurality of flow-rate control valves 24 provided at flow passage of the nitrogen compound (a), hydrocarbon compound (b), nitrogen (i) and steam (h), respectively, and regulates the flow rate of each component according to a signal from the control means 23. FIG. 4 illustrates an example of a sequence of the control means.

In FIG. 4, if the flow rate or temperature of the exhaust gas in the flue is largely fluctuated and the temperature of the combustion region (s) falls below the predetermined temperature, the control means 23 receives a signal 25 from the temperature measuring means 20 (thermocouple) and emits a signal 26 for operating each flow-rate control valve 24 in the flow-rate regulating means 22. By this operation, the flow rate of the hydrocarbon b is increased in order to promote spontaneous ignition, while the flow rate of the nitrogen compound (a) is decreased or stopped in order to prevent consumption. Also, in order to increase the concentration of the hydrocarbon compound (b), the flow rates of nitrogen (i) and/or steam (h) for concentration adjustment of the hydrocarbon compound (b) and nitrogen compound (a) are decreased or stopped, respectively. In this way, combustion of the hydrocarbon compound (b) can be promoted and the combustion region (s) can be maintained. After the combustion region (s) is made stable, the supply amount of the nitrogen compound (a) is increased so that denitration reaction can be conducted.

Alternatively, as shown in FIG. 3, ignition means 21 may be provided in the vicinity of the injection port 12. When the temperature of the combustion region (s) falls below the predetermined temperature, the control means 23 operates the ignition means 21 so that the hydrocarbon compound (b) can be forcedly burned. The ignition means 21 may be an electro-thermal coil, ignition plug, piezoelectric-element type igniter and the like, for example.

A set temperature for regulating the flow rate of the hydrocarbon compound (b) and the like and a set temperature for operating the ignition means 21 as mentioned above may be the same or different. For example, the set temperature for regulating the flow rate of the hydrocarbon compound (b) and the like may be set preferably at 500 to 800° C. and the set temperature for operating the ignition means 21 preferably at 300 to 500° C. That is because the ignition means 21 is operated to be forcedly burned when the temperature of the combustion region (s) falls below the ignition point of the hydrocarbon compound (b) and spontaneous ignition becomes difficult.

The above-mentioned process of the denitration treatment of the exhaust gas may be arranged at a plurality of spots for a single flue. Specifically, as a method of arrangement of a injection pipe for denitration treatment, the pipes may be aligned in a series from the upstream to the downstream of the flue or may be arranged in parallel on the cross-sectional face of a predetermined position. Moreover, the arrangement may be a combination of them.

Figure 5:
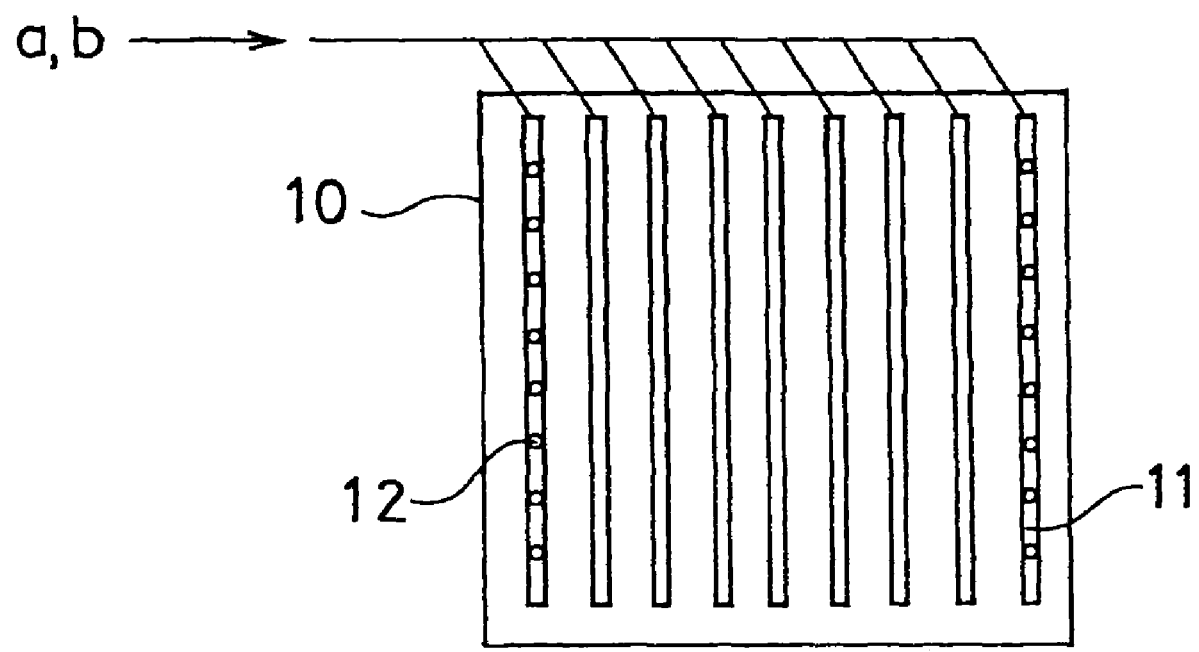
FIG. 5 is an explanatory diagram illustrating an example of a cross-sectional face of a flue provided with the injection pipe used in the present invention.
Figure 6:
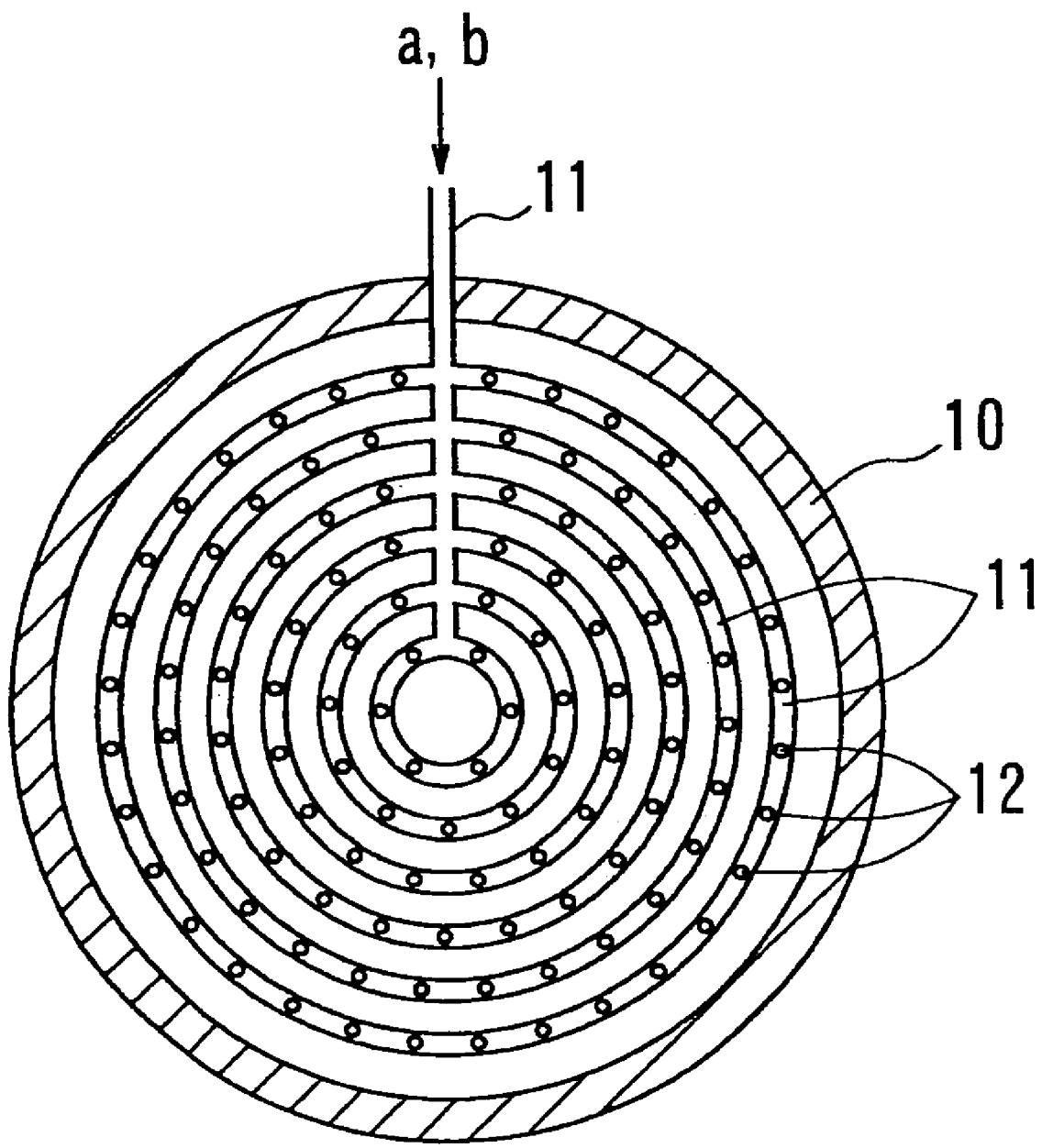
FIG. 6 is an explanatory diagram illustrating another example of the cross-sectional face of a flue provided with the injection pipe used in the present invention.

FIGS. 5 and 6 are explanatory diagrams illustrating an example of the cross-sectional face of the flue in which the injection pipes are arranged in parallel at predetermined positions in the flue.

In FIG. 5, the shape of the cross-sectional face of the flue 10 is a rectangle, and the plurality of injection pipes 11 are inserted into that and aligned substantially parallel on the plane perpendicular to the flow direction of the exhaust gas. The injection pipe 11 is preferably provided in the comb state in the flue 10 as above. On the side face on the upstream side of the flue of the injection pipe 11, a large number of injection ports 12 are provided so that the nitrogen compound (a) and hydrocarbon compound (b) are supplied. In the illustrated example, description of the injection port 12 is omitted for the inner injection pipe 11.

In FIG. 6, the shape of the cross-sectional face of the flue 10 is circular, into which the plurality of annular injection pipes 11 are inserted and arranged substantially concentrically on the plane perpendicular to the flow direction of the exhaust gas. The injection pipe 11 is preferably formed in the concentrically annular shape in the flue 10 as above. In this case, too, the large number of injection ports 12 are provided on the side face on the upstream side of the flue of the injection pipe 11.

By arranging the injection pipes in parallel on the plane perpendicular to the flow direction of the exhaust gas at the predetermined positions in the flue, the combustion region is formed over substantially the entire area of the cross-sectional face of the flue, and the exhaust gas can be mixed with amine radical uniformly and denitrated.

On the other hand, the denitration treatment as above may be provided in plural in the flow direction of the exhaust gas. That is, at least one denitration treatment may be added to the treated gas which has been denitrated. The denitration treatment is preferably applied to mix more amine radical for the treated gas discharged from the process of the first denitration treatment as above, and such denitration treatment is preferably carried out twice or more.

Figure 7:
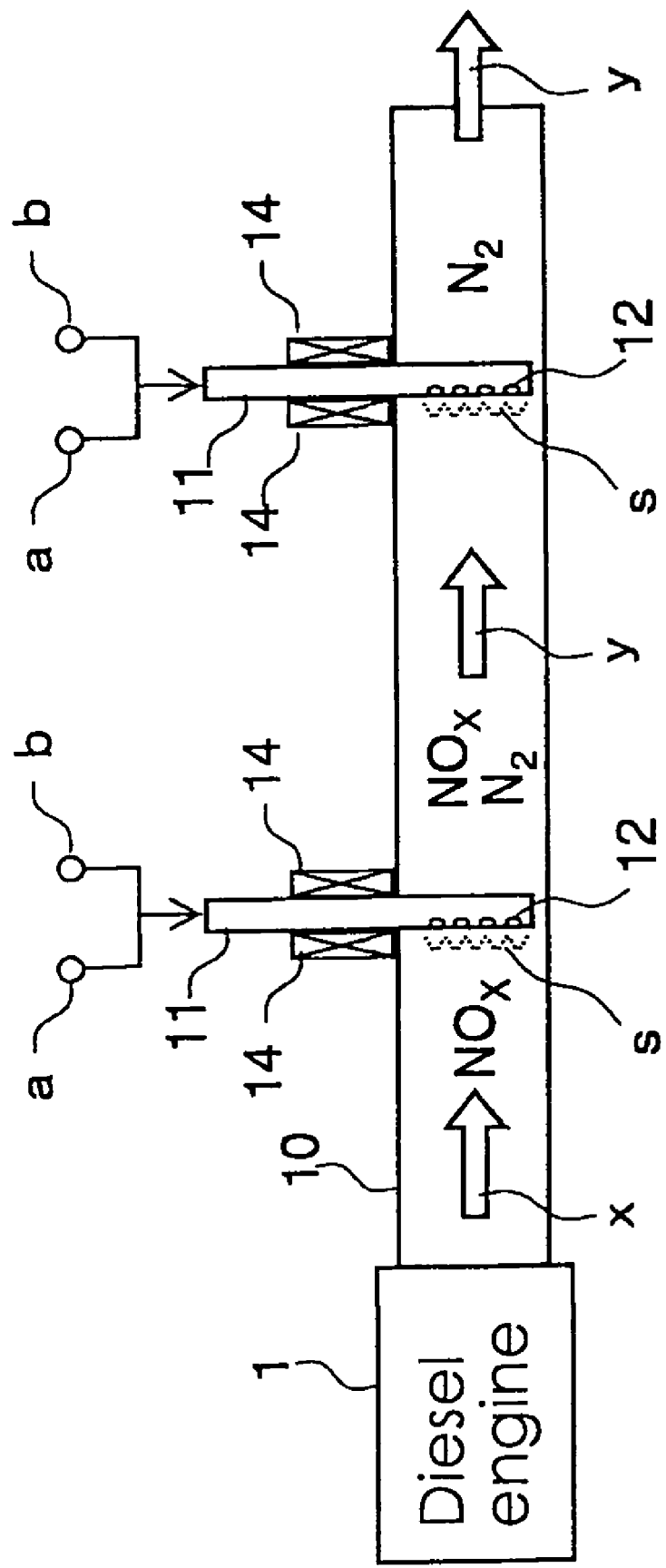
FIG. 7 is an explanatory diagram exemplifying another configuration of the exhaust gas denitration apparatus of the present invention.

FIG. 7 is an explanatory diagram illustrating another example of configuration of the exhaust gas denitration apparatus of the present invention, in which a plurality of denitration treatment processes are arranged in a series in the flow direction of the exhaust gas.

In FIG. 7, the exhaust gas (x) from the diesel engine 1 is mixed with the amine radical supplied by the injection pipe 11 on the upstream side and the first denitration treatment is conducted, and a treated gas (y) is discharged. In order to carry out further denitration treatment for the treated gas (y), the injection pipe 11 in the same configuration is arranged on the downstream side, and the nitrogen compound (a) and hydrocarbon compound (b) are supplied so as to form the combustion region (s) and mixed with the amine radical again. By aligning the injection pipes 11 in a series from the upstream to the downstream of the flue 10, that is, by providing the plurality of denitration treatment processes, the denitration rate can be further improved. The same configuration as that of the above-mentioned denitration treatment process may be applied to the configuration of the first and the second denitration process and after.

In the denitration method of the present invention, the amine radical generated in the combustion region is directly made to act on the nitrogen oxide in the exhaust gas, and the denitration process is rarely affected by the temperature of the exhaust gas or nitrogen oxide concentration. Thus, even if the amine radical is made to act on the treated gas having finished with the first denitration treatment, the denitration rate per treatment is not lowered. Therefore, the denitration reaction can be carried out in a cumulative manner, and the final denitration rate can be further improved by providing the plurality of denitration treatment processes for multi-stage exhaust gas treatment. Also, even if the denitration treatment is repeated several times for the exhaust gas containing sulfur oxides, the catalyst is not poisoned since a reducing catalyst is not used and ammonium sulfate or the like is not generated since there is little remaining nitrogen compound. Thus, the denitration efficiency is not lowered.

For example, supposing that the denitration rate per denitration treatment is 40%, the nitrogen oxide of 60% of the initial quantity remains in the treated gas having finished the first denitration treatment. If amine radical is further made to act on this treated gas, the remaining nitrogen oxide amounts to 36%. If amine radical is further made to act again, the nitrogen oxide remaining in the treated gas is 22%. Therefore, while the denitration rate when the denitration treatment is carried out once is 40%, the denitration rate after the treatment is carried out twice is 64%, the rate being 78% after three times, and a denitration rate as high as more than 60% can be achieved.

The denitration rate per denitration treatment when the amine radical is reacted with the nitrogen oxide under a low-temperature condition of 200 to 300° C. of the exhaust gas is 35 to 55%. In the case of the denitration rate of 35%, if amine radical is made to act twice, the cumulative denitration rate is 58%, and if being made to act three times, the rate is 73%. If the denitration rate is 55%, the cumulative denitration rate after the amine radical is made to act twice is 80% and 91% in the case of reaction three times, which results in achievement of an extremely high denitration rate.

The supply amount of the amine radical per unit time is preferably set at 0.5 to 1.5 mol, or more preferably at 0.7 to 1.3 mol for 1 mol flow rate of the nitrogen oxide to be treated per denitration treatment in which the amine radical is made to act with the exhaust gas (x) or the treated gas (y). By setting the amount of the amine radical to the nitrogen oxide in the exhaust gas and the treated gas in the above range, the reaction efficiency of the denitration treatment is improved and treatment costs can be reduced. The supply amount of the amine radical can be adjusted by the flow rates of the nitrogen compound and hydrocarbon compound added to the combustion region.

When the plurality of denitration treatment processes are arranged continuously, an interval between the adjacent denitration treatment processes is not particularly limited, but the denitration treatment process on the downstream may be arranged at a position where the flow of the exhaust gas disturbed by the denitration treatment process on the upstream is rectified again. For example, a ratio of the interval of the adjacent denitration treatment processes to the inner diameter of the flue 10 may be set preferably at 2 to 20, or more preferably at 5 to 10. By setting the interval of the adjacent denitration treatment processes in the above range, the efficiency of the denitration treatment on the downstream can be improved.

Moreover, in the adjacent denitration treatment processes on the upstream and downstream sides, the position or direction of the injection pipes to be inserted into the flue may be made different from each other. For example, by separating the positions to insert the injection pipe to the center or right and left of the cross-sectional face of the flue or by making the directions to insert the injection pipes different to perpendicular/horizontal, the amine radical is brought into contact with the region where the amine radical did not sufficiently reach in the upstream denitration treatment process so as to compensate for the lack in the downstream denitration treatment process and the exhaust gas flowing in the flue can be uniformly denitrated.

Figure 8:
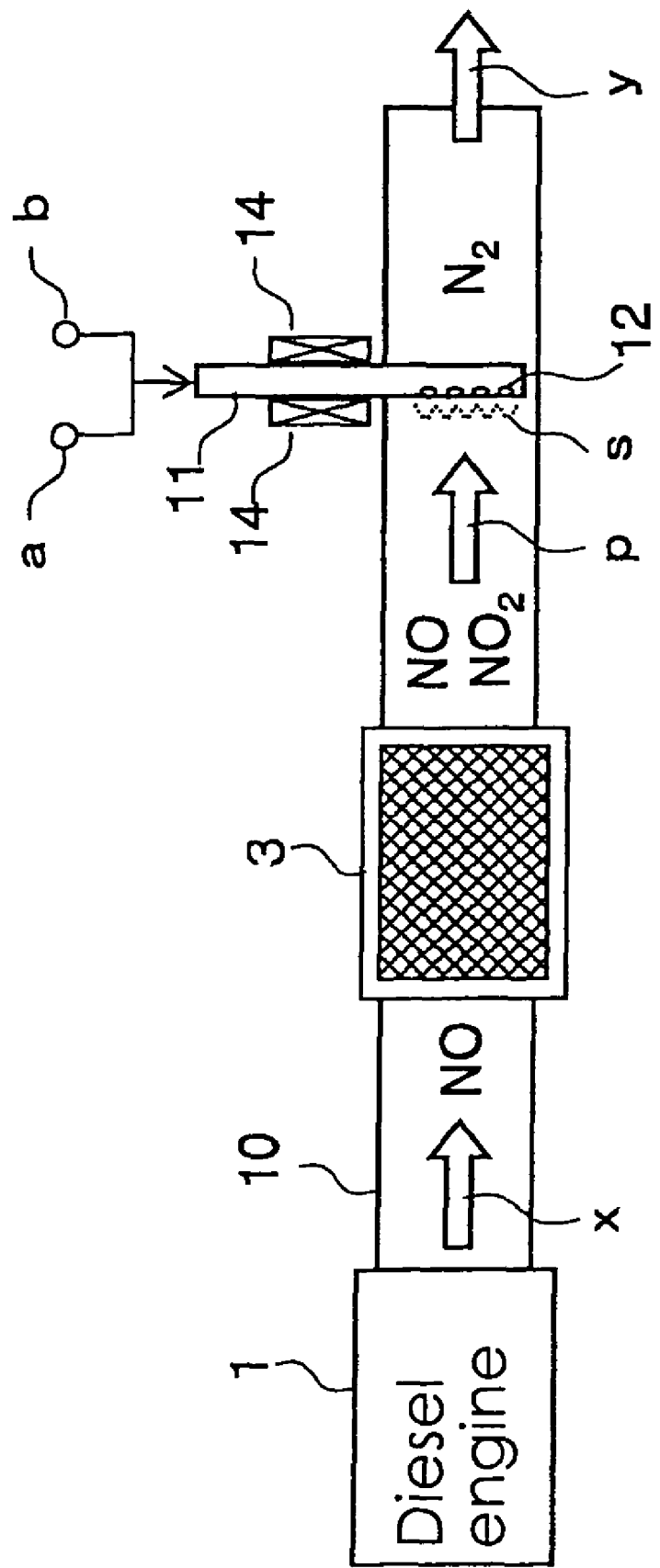
FIG. 8 is an explanatory diagram exemplifying another configuration of the exhaust gas denitration apparatus of the present invention.

In the denitration method of the present invention, as shown in FIG. 8, a preliminary process 3 in which a part of nitrogen monoxide in the nitrogen oxides in the exhaust gas (x) exhausted from the diesel engine 1 is oxidized so as to generate nitrogen dioxide is preferably provided on the upstream of the denitration treatment process. By oxidizing a part of nitrogen monoxide in the exhaust gas so as to generate nitrogen dioxide with higher reactivity and by supplying preliminary treated gas (p) containing the nitrogen dioxide to the denitration treatment process, the nitrogen oxides can be reductively decomposed more easily. Therefore, even if the temperature of the exhaust gas is low, the synergetic effect of improved reactivity of the nitrogen oxides and reaction of the amine radical with high reactivity can be obtained, which results in further improvement of the final denitration rate.

The exhaust gas from the diesel engine has the nitrogen monoxide as a main component as the nitrogen oxides. In the preliminary process, there is no need to oxidize all the nitrogen monoxide but only a part of the nitrogen monoxide should be oxidized to nitrogen dioxide. That is, a proportion of the nitrogen dioxide in the nitrogen oxides in the preliminary treated gas (p) discharged from the preliminary process is set preferably at 40 weight % or more, or more preferably at 50 weight % or more. By setting the proportion of the nitrogen dioxide in this range, reducing decomposition of the nitrogen oxides in the denitration treatment process can be carried out easily.

The treatment to oxidize the nitrogen monoxide to nitrogen dioxide is not particularly limited but plasma irradiation treatment, ozone treatment, contact treatment with oxidation catalyst or contact treatment with hydrocarbon compound with the carbon number of 5 or more at 500 to 700° C. is preferable. Among them, the contact treatment with the oxidation catalyst, plasma irradiation treatment, and the contact treatment with the hydrocarbon compound with the carbon number of 5 or more at 500 to 700° C. is preferable since the sulfur dioxide in the exhaust gas is not oxidized but only nitrogen monoxide is selectively oxidized.

In general, with the oxidation treatment for the exhaust as containing sulfur dioxide, not only nitrogen monoxide but sulfur dioxide is also oxidized and made into a particulate matter, which is hard to be removed, or a problem that it reacts with ammonia at the denitration treatment and generates ammonium hydrogen sulfate tends to occur easily. Thus, by using the contact treatment with the oxidation catalyst, plasma irradiation treatment or the contact treatment with the hydrocarbon compound with the carbon number of 5 or more at 500 to 700° C. as the oxidation treatment of the exhaust gas, nitrogen monoxide is selectively oxidized to nitrogen dioxide, while sulfur dioxide is rarely oxidized, and the above problem can be prevented.

The plasma irradiation treatment is not particularly limited as long as the nitrogen monoxide is selectively oxidized, but atmospheric-pressure low-temperature plasma irradiation treatment can be preferably cited, and micro-wave discharge, alternating-current discharge (pulse discharge, for example), or direct-current discharge (spark discharge, ark discharge, for example) is preferable.

Means for the atmospheric-pressure low-temperature plasma irradiation is preferably such that its plasma generation electrode generates plasma by atmospheric-pressure pulse discharge, and efficient oxidization of the nitrogen monoxide by favorably generating and irradiating plasma while the exhaust gas is made to flow all the time is recommended. As such a plasma generation electrode, those with a coaxial structure with stainless, steel, kanthal, inconel and the like as a core can be cited. These plasma generation electrodes can oxidize the nitrogen monoxide to nitrogen dioxide with low energy.

On the other hand, by flowing the exhaust gas through a catalyst layer having an oxidation catalyst, the nitrogen monoxide in the exhaust gas can be oxidized into nitrogen dioxide. The oxidation catalyst is not particularly limited as long as the nitrogen monoxide is selectively oxidized, but a catalyst having active metal carried by a carrier containing titanium is preferable. The active metal may be at least one selected from vanadium compound, niobium compound, molybdenum compound, and tungsten compound, and particularly vanadium compound and tungsten compound are preferable. These oxidation catalysts perform a function of a catalyst to selectively oxidize nitrogen monoxide to nitrogen dioxide while restricting oxidation of sulfur dioxide into sulfur trioxide or the like. Also, the oxidation catalyst having these active metals is rarely poisoned by sulfur trioxide or the like in the exhaust gas and can maintain the function to oxidize the nitrogen monoxide for a long time.

The oxidation rate of the nitrogen monoxide in these oxidation catalysts is lower than the oxidation rate of a platinum catalyst, which is a general oxidation catalyst, in some cases. However, the low oxidation rate can be compensated by increase of the amount of active metal to be used. That is, these active metals can be obtained more inexpensively than the platinum catalyst, and by increasing the use amount, a generation amount of nitrogen dioxide can be made equal to that of the platinum catalyst.

The active metals include vanadium oxide, vanadyl sulfate, vanadyl nitrate, vanadium chloride and the like as the vanadium compounds, for example, niobium oxide, niobium sulfate, niobium chloride and the like as the niobium compounds, for example, molybdenum oxide, molybdenum sulfate, molybdenum chloride and the like as molybdenum compounds, for example, and tungsten oxide, tungsten sulfate, tungsten chloride and the like as the tungsten compounds, for example are preferable. Among them, vanadium oxide, tungsten oxide, molybdenum oxide, and niobium oxide are more preferable. These active metals may be used singularly but two or more of the above may be used in combination.

Particularly, by using the vanadium compound and tungsten compound at the same time as active metals, more remarkable effects can be obtained. Specifically, vanadium oxide and tungsten oxide, vanadium oxide and molybdenum oxide, and vanadium oxide and niobium oxide are preferable. Particularly, by using the vanadium oxide and tungsten oxide as the active metals, the oxidation rate of sulfur dioxide can be restricted while improving the oxidation rate of nitrogen monoxide.

The active metal is preferably carried by a carrier containing titanium, that is, $TiO_2$. By using $TiO_2$ for the carrier, the oxidation rate of the sulfur dioxide can be restricted while maintaining the oxidation rate of nitrogen monoxide, which is preferable.

Thus, the oxidation catalyst used in the preliminary process of the present invention is most preferable those having vanadium oxide and tungsten oxide carried by $TiO_2$ or having vanadium oxide carried by $TiO_2$.

Figure 9:
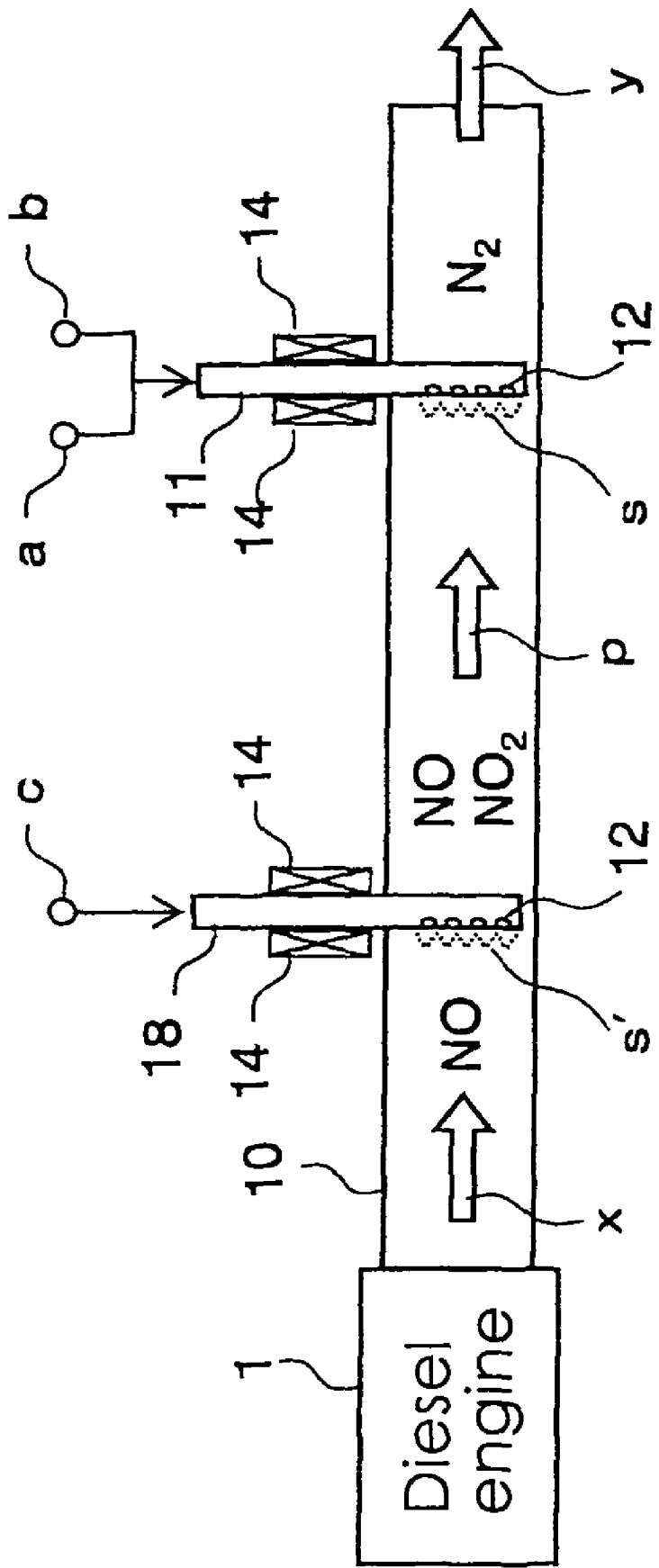
FIG. 9 is an explanatory diagram exemplifying another configuration of the exhaust gas denitration apparatus of the present invention.

On the other hand, by supplying the hydrocarbon compound (c) with the carbon number of 5 or more heated to the temperature of 500 to 700° C. as shown in FIG. 9 as the oxidation treatment in the preliminary process and carrying out the contact treatment, a part of the nitrogen monoxide in the exhaust gas (x) is preferably oxidized into nitrogen dioxide.

In FIG. 9, the exhaust gas (x) is exhausted from the diesel engine 1 along the flue 10, the hydrocarbon compound (c) is introduced into the piping communicating with a preliminary injection pipe 18 as the preliminary process and heated by the heating means 14 arranged outside the flue 10 to a temperature of 500 to 700° C. and supplied from the injection port 12 formed on the side face on the upstream side of the flue of the preliminary injection pipe 18 into the flue 10. The hydrocarbon compound (c) is brought into contact with the oxygen in the exhaust gas, spontaneously ignites, forms a combustion region (s') and generates hydroxyradical at a high temperature. The hydroxyradical oxidizes the nitrogen monoxide in the exhaust gas (x) into nitrogen dioxide. Since the preliminary treated gas (p) discharged from the preliminary process contains nitrogen dioxide with high reactivity, it is decomposed with a high denitration rate in the denitration treatment process. Here, a reaction process in which the nitrogen monoxide is oxidized into nitrogen dioxide is assumed to be as follows.

First, the hydrocarbon compound (c) at 500 to 700° C. is brought into contact with the oxygen in the exhaust gas and spontaneously ignites, and hydroxyradical is generated at a high temperature. Then, the hydroxyradical is considered to oxidize the nitrogen monoxide in the exhaust gas and to generate the nitrogen dioxide. The reaction process itself has not been confirmed, but it can be so assumed since when the high-temperature hydrocarbon compound (c) is supplied, the temperature of the periphery of the injection port is raised by 100° C. or more, the concentrations of the nitrogen monoxide and oxygen in the composition of the exhaust gas are lowered, the concentrations of the nitrogen dioxide and carbon monoxide are increased, and no change is found in the exhaust gas temperature and gas composition even if an inactive gas at the same temperature is supplied instead of the hydrocarbon compound (c).

Also, the hydrocarbon compound (c) is burned in the exhaust gas and the temperature of the peripheral exhaust gas is raised and an effect that the reactivity of the nitrogen oxides (mixture of the nitrogen monoxide and nitrogen dioxide) is further improved can be expected.

The hydrocarbon compound (c) is a hydrocarbon compound with the carbon number of 5 or more or preferably the carbon number of 5 to 16. If the carbon number is less than 5, when it is supplied into the exhaust gas at a high temperature, the effect to oxidize nitrogen monoxide to nitrogen dioxide becomes poor. The temperature of the hydrocarbon compound (c) is 500 to 700° C. and preferably 500 to 600° C. By setting the temperature of the hydrocarbon compound (c) at 500 to 700° C., hydroxyradical is efficiently generated, the nitrogen monoxide in the exhaust gas is oxidized into nitrogen dioxide, and a proportion of the nitrogen dioxide in the nitrogen oxides can be increased preferably to 40 weight % or more, or more preferably to 50 weight % or more.

The ignition point of the hydrocarbon compound (c) is preferably 300° C. or less or more preferably 200 to 260° C. If the hydrocarbon compound with the ignition temperature exceeding 300° C. is used, the effect to generate nitrogen dioxide from nitrogen monoxide becomes poor, which is not preferable. That is considered to be because spontaneous ignition is difficult when being introduced into the flue, the combustion region can not be continuously formed even in the case of spontaneous ignition and flame is easily extinguished or the like. The ignition point in the present invention is a spontaneous ignition temperature based on DIN-51794.

Such hydrocarbon compound (c) is not particularly limited as long as the above natures are provided but may be selected as appropriate for use from paraffin, olefin, kerosene, light oil and the like. Among them, it is preferably at least one type selected from n-hexane, n-octane, n-dodecane, kerosene, and light oil, and particularly, n-hexane, n-octane with high hydroxyradical generation efficiency are preferable.

The concentration of the hydrocarbon compound (c) supplied in the preliminary process may be adjusted by adding nitrogen and/or steam. The concentration of the hydrocarbon compound (c) is preferably 0.5 to 30 volume %, or more preferably 1 to 15 volume %. If the concentration of the hydrocarbon compound (c) is less than 0.5 volume %, the hydrocarbon compound (c) is difficult to spontaneously ignite and the proportion of the nitrogen dioxide in the exhaust gas can not be sufficiently increased. When the concentration of the hydrocarbon compound (c) exceeds 30 volume %, a side reaction (incomplete combustion, partial oxidation and the like) other than combustion easily occurs due to a relation with the oxygen concentration in the exhaust gas, and the effect to increase the proportion of the nitrogen dioxide in the exhaust gas can not be fully exerted.

The supply amount of the hydrocarbon compound (c) is preferably determined in relation with the flow rate of the nitrogen oxide in the exhaust gas, and the molar ratio of the hydrocarbon compound (c)/nitrogen oxide is preferably 0.5 to 1.5, or more preferably 0.7 to 1.3. If the molar ratio of the hydrocarbon compound (c)/nitrogen oxide is less than 0.5, hydroxyradical is hard to be effectively generated and generation of amine radical is decreased, while if the molar ratio exceeds 1.5, the proportion of the hydrocarbon compound remaining in the exhaust gas is increased, either of which is not preferable.

In the preliminary process, the nitrogen compound (a) is preferably supplied with the hydrocarbon compound (c) from the preliminary injection pipe 18 into the flue 10. By supplying the hydrocarbon compound (c) and nitrogen compound (a) at the same time, similarly to the denitration treatment process, the amine radical is generated and the nitrogen oxide in the exhaust gas can be reductively decomposed. The main denitration treatment is carried out in the denitration treatment process on the downstream side, but the preliminary denitration treatment in the preliminary process can further improve the final denitration rate, which is preferable. The types of nitrogen compounds may be appropriately selected from the same group as the nitrogen compounds used in the denitration treatment for use.

The preliminary injection pipe 18 has an end portion projecting into the flue closed and the injection port 12 formed on the side face on the upstream side of the flue similarly to the injection pipe 11 used in the denitration treatment process. By supplying a gas such as the hydrocarbon compound (c) from the injection port 12 toward the upstream side of the flue, mixture with oxygen in the exhaust gas is promoted and spontaneous ignition begins more easily. Other than that, the arrangement method and the number of arrangements of the preliminary injection pipes 18 as well as the number, size and arrangement method of the injection ports may be configured similarly to the above injection pipes 11 and their injection ports.

The heating means 14 used in the preliminary process is not particularly limited as long as it can heat and control the gas supplied to the flue 10 at a predetermined high temperature, but electric heaters, heat exchangers, heaters by combustion gas and the like may be used. Among them, the electric heater is preferable since it can control the supply gas at a predetermined high temperature easily.

Also, the ignition means is preferably arranged in the vicinity of the injection port 12 of the preliminary injection pipe 18. By arranging the ignition means, even if the hydrocarbon compound (c) does not spontaneously ignite, it can be ignited. Also, if the combustion region (s') is lost, ignition can be enabled again. By maintaining the combustion region (s') in this way, hydroxyradical is generated from the hydrocarbon compound (c), oxidation of nitrogen monoxide is made stable, and removal treatment of the nitrogen oxides can be efficiently proceeded with. The ignition means is not particularly limited but electro-thermal coils, ignition plugs, discharge devices and the like are preferably used.

Similarly to the denitration process, the temperature measuring means is preferably arranged in the vicinity of the injection port 12 of the preliminary injection pipe 18 so that the temperature of the combustion region (s') is detected and the ignition means and the supply amount of the hydrocarbon compound (c) can be controlled.

When the preliminary process and the denitration treatment process are arranged adjacently, the interval is not particularly limited but a ratio of the interval between the preliminary process and the denitration treatment process to the inner diameter of the flue 10 is preferably set at 1 to 20, for example, or more preferably 3 to 10. By setting the interval between the preliminary process and the denitration treatment process in this range, the denitration rate can be further improved.

Regardless of which of the above methods the oxidation treatment in the preliminary process is, supposing the oxidation rate of nitrogen monoxide as Nc and the oxidation rate of sulfur dioxide as Sc, the ratio Sc/Nc of the oxidation rate Sc of the sulfur dioxide to the oxidation rate Nc of the nitrogen monoxide is preferably 0.01 to 0.2, more preferably 0.01 to 0.1 or further preferably 0.01 to 0.05. By setting the ratio Sc/Nc of the oxidation rates in the above range, oxidation from nitrogen monoxide to nitrogen dioxide is selectively promoted, and while reactivity of the nitrogen oxides is improved, a problem caused by oxidation of sulfur dioxide to sulfur trioxide or the like can be restricted.

In the oxidation treatment in the preliminary process of the present invention, the oxidation rate Nc of nitrogen monoxide is preferably 30% or more, more preferably 40% or more or further preferably 50% or more. By setting the oxidation rate Nc in the above range, nitrogen dioxide can be generated more effectively. The oxidation rate Sc of sulfur dioxide is preferably 5% or less, more preferably 2% or less or further preferably 1% or less. By setting the oxidation rate Sc in the above range, generation of sulfur trioxide or the like can be advantageously restricted.

In the present invention, the oxidation rate Nc of nitrogen monoxide and the oxidation rate Sc of sulfur dioxide are calculated by measuring the nitrogen oxide concentration and sulfur oxide concentration of the exhaust gas (x) and the preliminary treated gas (p), respectively.

Figure 10:
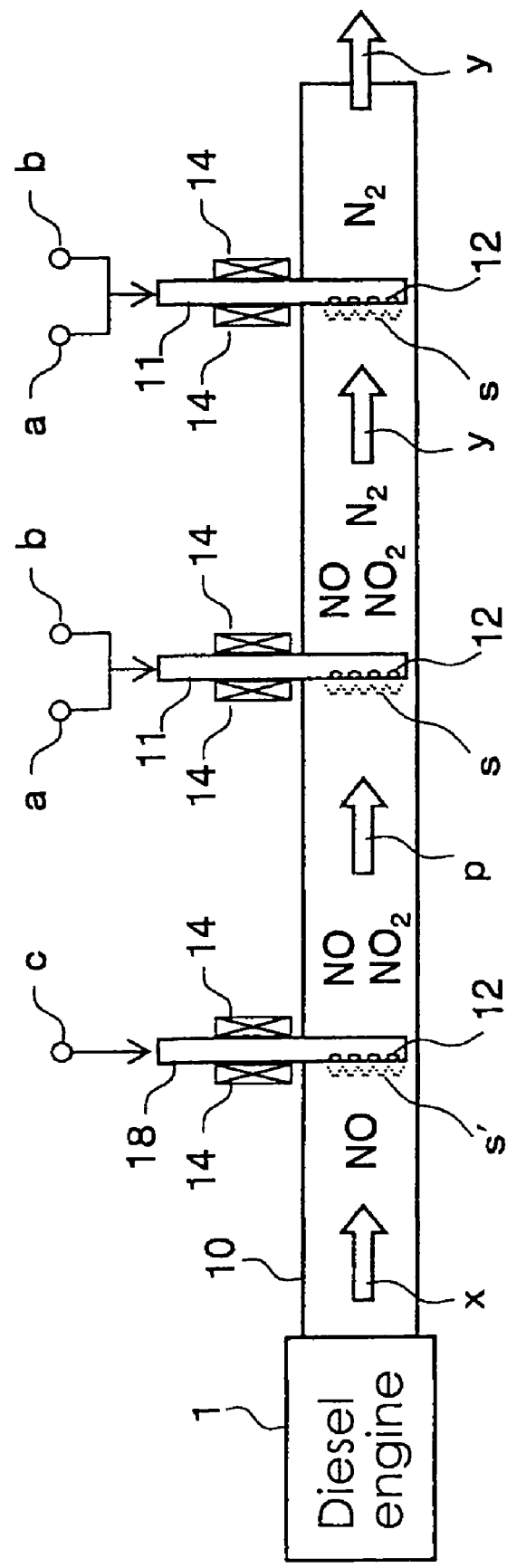
FIG. 10 is an explanatory diagram exemplifying another configuration of the exhaust gas denitration apparatus of the present invention.

The denitration method of the present invention may, as shown in FIG. 10, carry out the denitration treatment several times after the preliminary process. The configurations of the preliminary process and the denitration process are as mentioned above, and duplicated explanation will be omitted. The example in FIG. 10 illustrates contact treatment of the hydrocarbon compound (c) at 500 to 700° as the preliminary process, but the preliminary process may be any of the above treatment methods. In the preliminary process, by increasing the proportion of nitrogen dioxide in the exhaust gas and improving the reactivity and then, by executing the denitration process several times, the denitration rate of the exhaust gas can be increased the most, which is preferable.

In the present invention, the temperatures of the nitrogen compound and hydrocarbon compound supplied to the denitration treatment process and the preliminary process are raised to the predetermined temperature and then, the temperature is preferably maintained and the nitrogen compound and hydrocarbon compound are supplied into the flue, which can stabilize formation of the combustion region.

Figure 11:
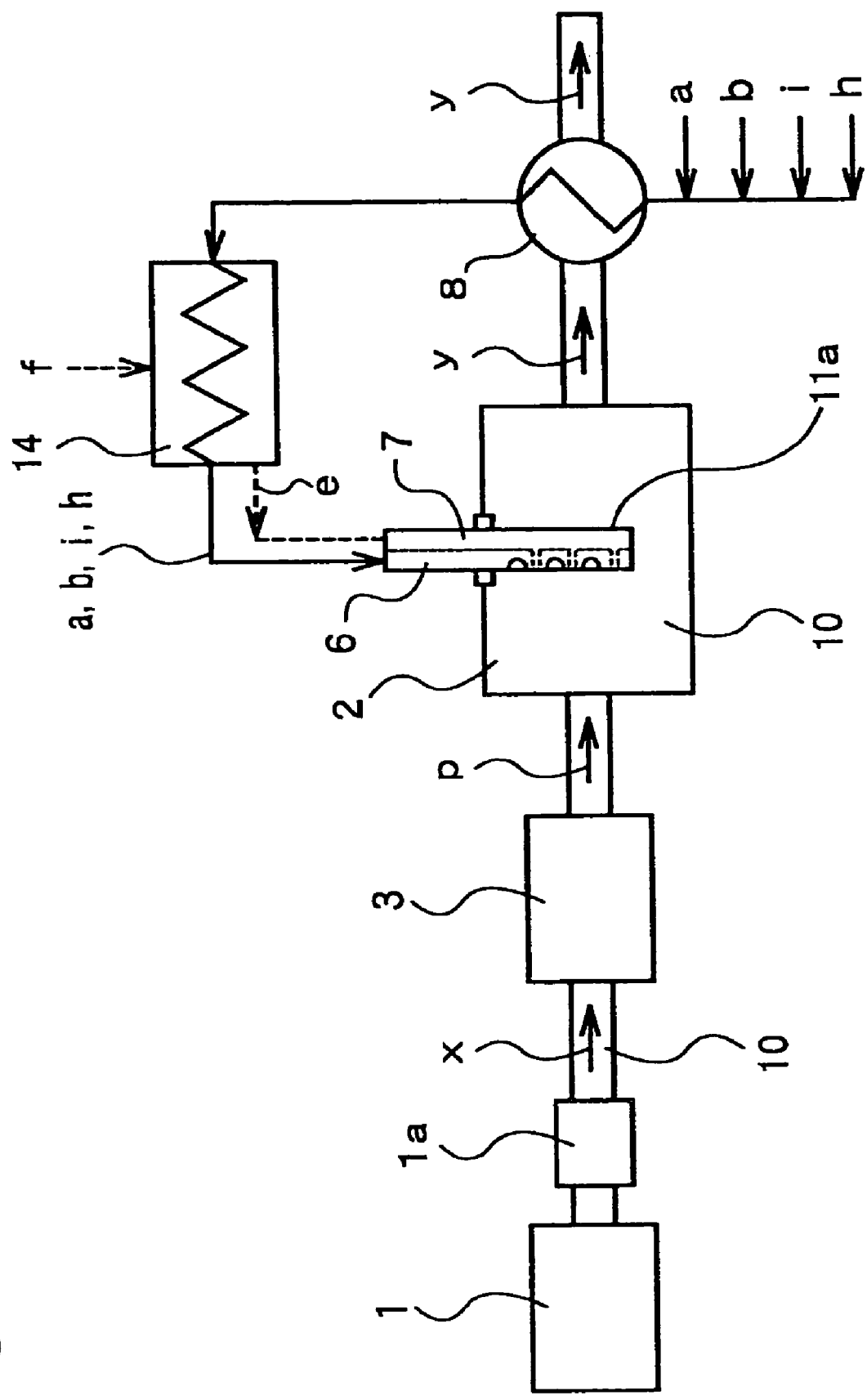
FIG. 11 is an explanatory diagram exemplifying another configuration of the exhaust gas denitration apparatus of the present invention.

Thus, as shown in FIG. 11, when a combustion gas (e) having burned a fuel (f) is used as the heating means 14 for the nitrogen compound and hydrocarbon compound, the temperature of the nitrogen compound and hydrocarbon compound are raised to a predetermined temperature and then, the combustion gas (e) discharged from the heating means 14 is preferably supplied from a combustion gas introduction path 7 integrally provided at the injection pipe 11a into the flue.

In FIG. 11, reference numeral 1 denotes a diesel engine, 1a for a turbo charger, 10 for the flue, 3 for the preliminary process, 2 for the denitration process, 11a for the injection pipe, 14 for the heating means, and 8 for a pre-heater. The exhaust gas (x) exhausted from the diesel engine 1 is supplied to the preliminary process 3 through the turbo charger 1a depending on the cases. In the preliminary process 3, in the exhaust gas (x) at a relatively low temperature (approximately 250 to 350° C., for example), a part of nitrogen monoxide (NO) contained in the exhaust gas (x) is oxidized by the oxidation treatment such as plasma irradiation treatment or the like into nitrogen dioxide ($NO_2$) and supplied to the denitration treatment process 2 as the preliminary treated gas (p).

On the other hand, the supply gas selected from the nitrogen compound (a), hydrocarbon compound (b), nitrogen (i) and steam (h) is introduced into the piping passing through the pre-heater 8 and pre-heated and then, fed to the heating means 14 so as to be heated to a predetermined temperature (to 600 to 1000° C., for example). The supply gas such as the hydrocarbon compound (b) or the like whose temperature has been raised by the heating means 14 is supplied to the supply gas introduction path 6 of the injection pipe 11a of the denitration treatment process 2. At this time, the piping for the supply gas such as the hydrocarbon compound (b) is preferably covered by an insulating material, not shown, to be kept warm.

At the heating means 14, the fuel (f') (such as propane, light oil or the like, for example) is burned by a burner, not shown, and as already described, the temperature of the supply gas such as the hydrocarbon compound (b) or the like is raised to the predetermined temperature, and the combustion gas (e) at a high temperature after having been heated (900 to 1100° C., for example) is introduced into the combustion gas introduction path 7 of the injection pipe 11*a*. At this time, the piping for the combustion gas is preferably covered by an insulating material, not shown, to be kept the heat in. As the heating means 14, an electric heater may be applied instead of a heating furnace or combustion furnace using a burner, in which case, a heated air in the heating means 14 is preferably supplied into the combustion gas introduction path 7 of the injection pipe 11*a* forcedly.

As mentioned above, the temperature of the supply gas such as the hydrocarbon compound (b) or the like supplied into the supply gas introduction path 6 of the injection pipe 11*a* is maintained by the high-temperature combustion gas (e) at a high temperature supplied to the combustion gas introduction path 7 integrally attached to the injection pipe 11*a*. That is, by passing the high-temperature combustion gas (e) to the combustion gas introduction path 7, the activity of the supply gas such as the hydrocarbon compound (b) or the like supplied to the supply gas introduction path 6 can be maintained. Thus, without excessively using energy, the hydrocarbon compound (b) is burned, stable combustion region is formed, and nitrogen oxide in the exhaust gas can be reductively decomposed.

Figure 12:
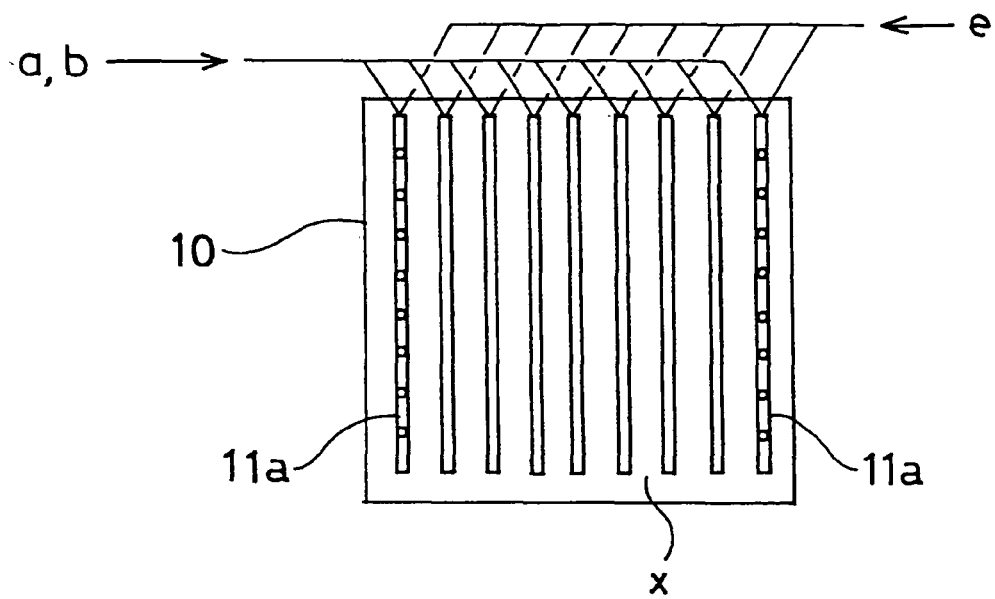
FIG. 12 is an explanatory diagram illustrating another example of the cross-sectional face of the flue provided with the injection pipe used in the present invention.

The injection pipe 11*a* may be provided in a state of a large number of combs on the cross-sectional face inside the flue 10 with a square or rectangular cross-sectional face as shown in FIG. 12, for example. In the illustrated example, description of the injection port and the like is omitted for the injection pipe 11 inside.

Figure 13:
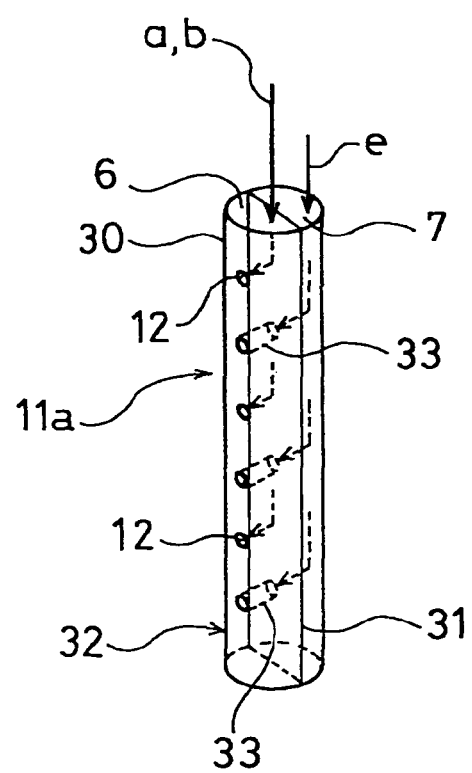
FIG. 13 is an explanatory diagram illustrating an example of configuration of the injection pipe used in the present invention.

The injection pipe 11*a* is, as shown in FIG. 13, formed by the pipe body 30, a bulkhead 31 provided therein, the injection port 12 provided at one of pipe walls 32 partitioned by the bulkhead 31, and a combustion-gas injection nozzle 33 penetrating the bulkhead 31 and the pipe wall 32. That is, inside of the hollow cylindrical pipe body 30 is divided into halves by the strip-state bulkhead 31 inserted into the longitudinal direction, in which a portion in front of the bulkhead 31 is made as the supply gas introduction paths 6 and a portion behind the bulkhead 31 is made as the combustion gas introduction path 7. Thus, since a contact area between the nitrogen compound and hydrocarbon compound as well as the combustion gas is increased by the bulkhead 31, by which temperature drop of the supply gas such as the nitrogen compound and hydrocarbon compound can be restricted.

Moreover, a large number of the injection ports 12 are provided with a certain interval in the longitudinal direction in the pipe body 30 in the gutter-shaped pipe wall 32 located in front of the bulkhead 31. Also, the combustion-gas injection nozzle 33 is provided penetrating the bulkhead 31 and the pipe wall 32 in front of the bulkhead between the adjacent injection ports 12. The high-temperature combustion gas (e) supplied to the combustion gas introduction path 7 is discharged into the flue 10 through the combustion-gas injection nozzle 33. The injection pipe 11*a* is installed in the flue 10 so that the injection port 12 and the combustion-gas injection nozzle 33 are directed to the upstream side.

Figure 14:
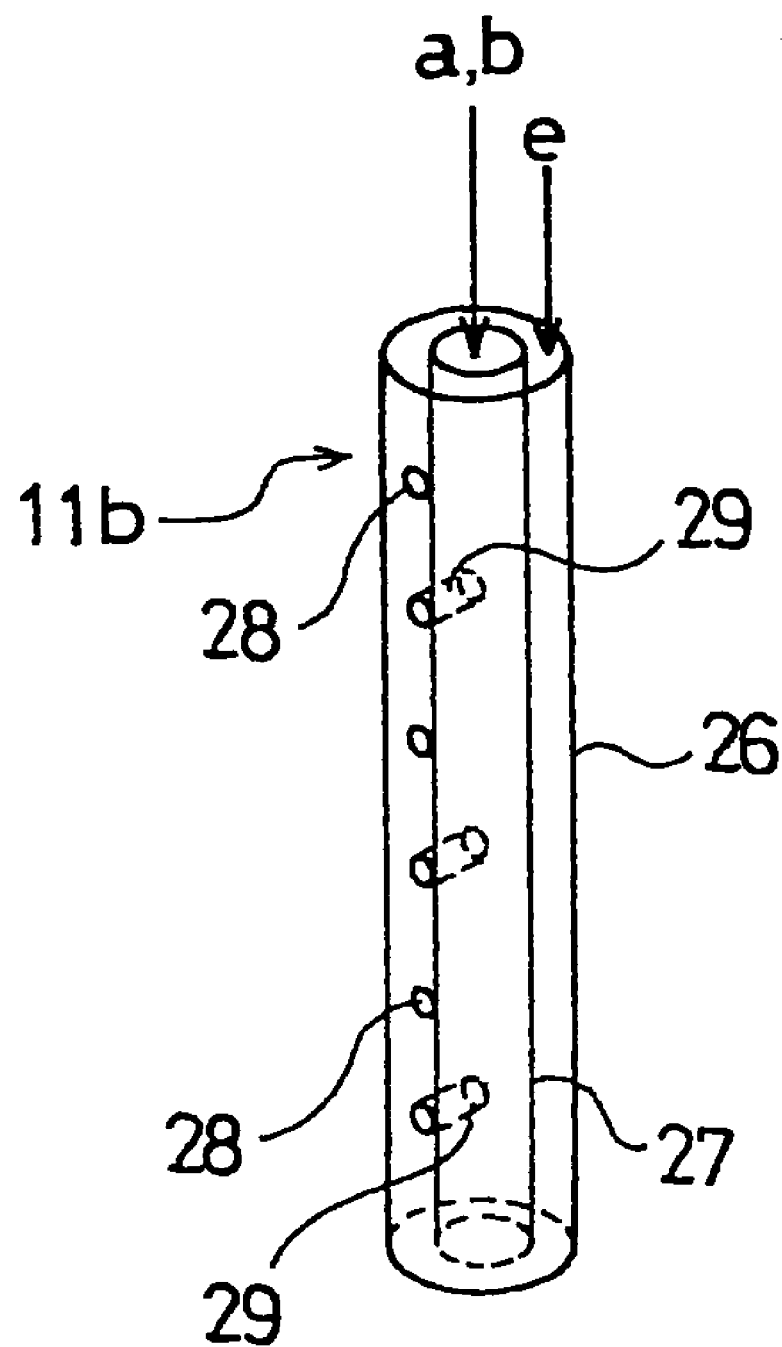
FIG. 14 is an explanatory diagram illustrating another example of configuration of the injection pipe used in the present invention.

As another embodiment of the injection pipe, as shown in FIG. 14, a double-pipe type injection pipe 11*b* may be applied. The double-pipe type injection pipe 11*b* is made of an outer pipe 26 and an inner pipe 27, the supply gas such as hydrocarbon compound (b) or the like passes through the inner pipe 27, and the combustion gas (e) passes between the outer pipe 26 and the inner pipe 27. Moreover, a supply-gas injection nozzle 29 is provided penetrating the inner pipe 27 and the outer pipe 26. Since the combustion gas (e) surrounds the periphery of the inner pipe 27 through which the supply gas such as the hydrocarbon compound (b) or the like passes, the temperature drop of the supply gas such as the hydrocarbon compound (b) or the like can be assuredly prevented.

Figure 15:
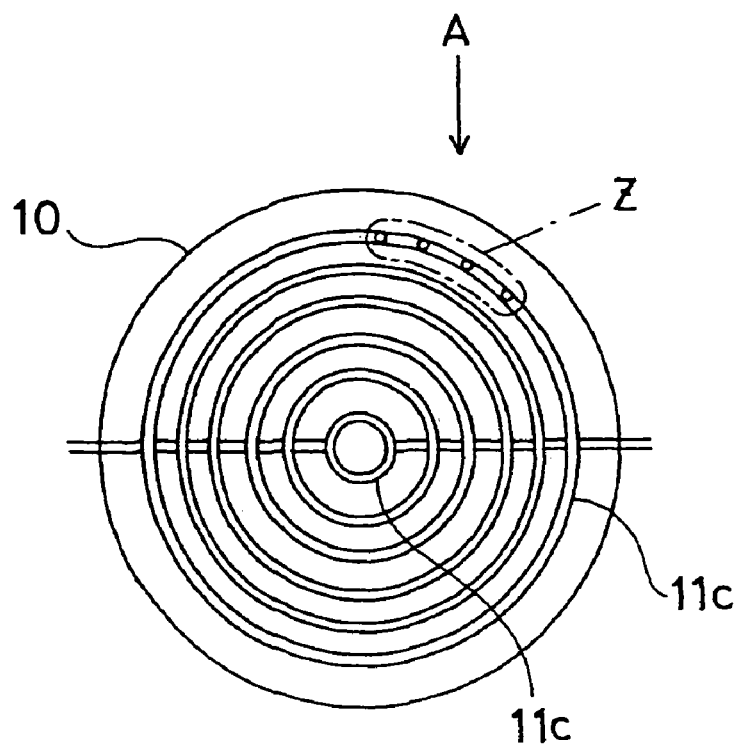
FIG. 15 is an explanatory diagram illustrating another example of the cross-sectional face of the flue provided with the exhaust gas denitration apparatus of the present invention.

If the cross-sectional face of the flue 10 is circular, as shown in FIG. 15, a injection pipe 11*c* in an annular shape may be provided concentrically in the cylindrical flue 10. In the illustrated example, description on the injection port and the combustion-gas injection nozzle other than the (Z) part in the injection pipe 11 is omitted.

Figure 16:
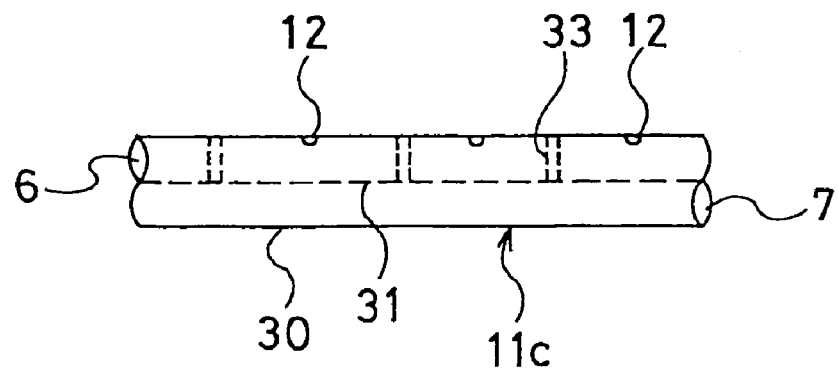
FIG. 16 is an enlarged view of an essential part seen on arrow (A) of a (Z) part in FIG. 15.

FIG. 16 is an enlarged view of an essential part on arrow (A) of the (Z) part of the annular injection pipe 11*c* shown in FIG. 15. The same reference numerals are given to the same components in the straight type injection pipe 11*a* and detailed explanation will be omitted. Since the injection pipe 11*c* is formed in the annular shape concentrically in the flue 10, the temperatures of the nitrogen compound and hydrocarbon compound blown out of the injection pipe 11*c* is maintained, and the degree of contact with the nitrogen oxide in the exhaust gas can be made uniform.

Figure 17:
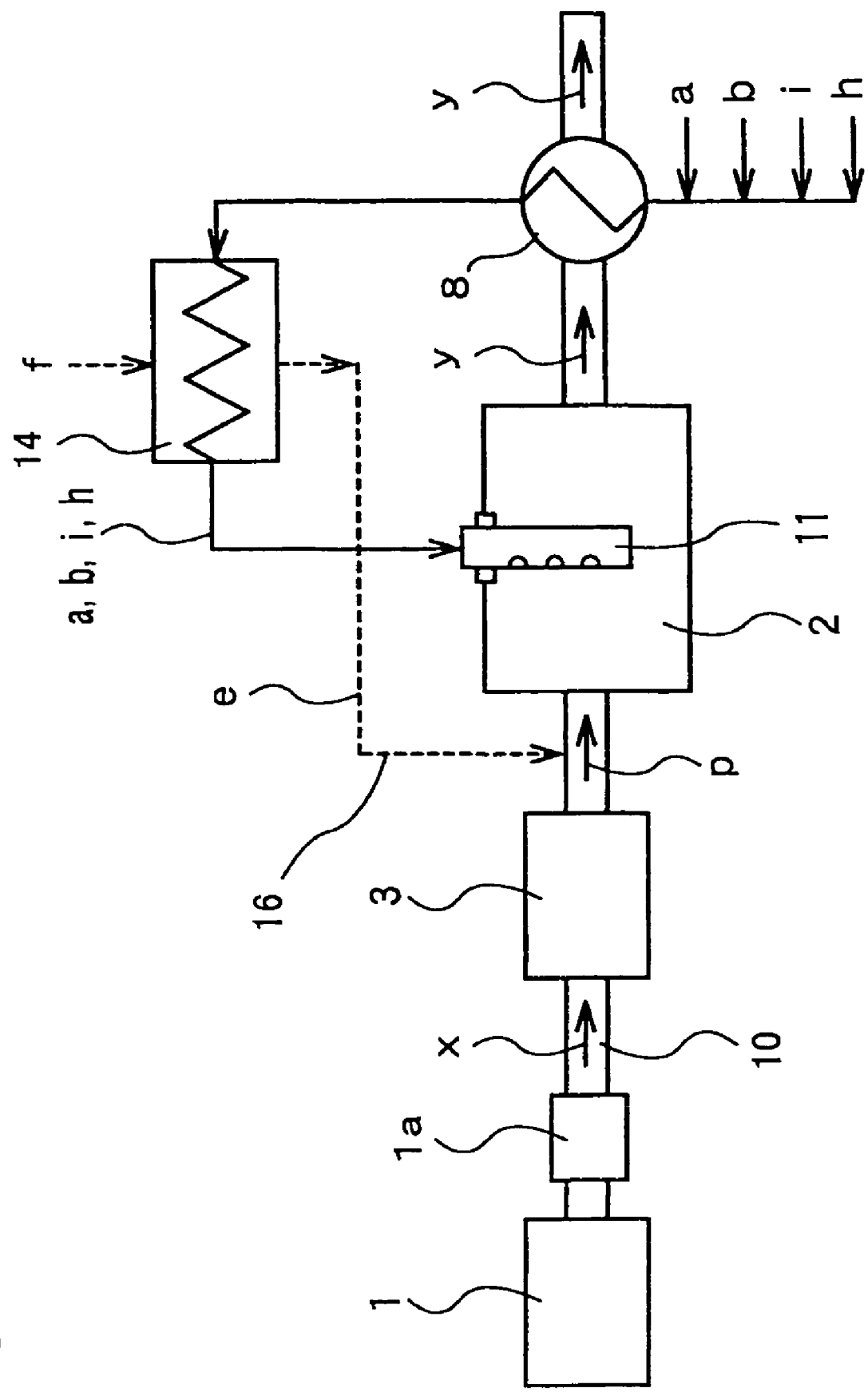
FIG. 17 is an explanatory diagram exemplifying another configuration of the exhaust gas denitration apparatus of the present invention.

In the denitration method of the exhaust gas according to the present invention, in order to raise the temperature of the exhaust gas (x) from the diesel engine, the combustion gas (e) used in the above-mentioned heating means 14 is preferably used for heating of the exhaust gas (x) as shown in FIG. 17.

In FIG. 17, when the heating means 14 raises the temperatures of the nitrogen compound (a) and hydrocarbon compound (b) to the predetermined temperature by the combustion gas (e), the combustion gas (e) discharged from the heating means 14 is preferably supplied to the upstream side of the injection pipe 11 for denitration treatment of the flue 10. Also, at the distal end of the piping 16 supplying the combustion gas (e), a injection portion formed similarly to the injection pipe 11 in FIG. 2 may be provided so that the combustion gas (e) is blown out to the upstream side of the denitration treatment process 2.

By supplying the combustion gas (e) to the upstream side of the flue 10 as above, the temperature of the exhaust gas can be raised. For example, if the high-temperature combustion gas generated by the heating means (900 to 1100° C., for example) is supplied to the upstream side of the flue 10, though depending on the flow-rate ratio between the both, the temperature of the exhaust gas can be raised by approximately 30 to 50° C. from approximately 250 to 350° C. Therefore, without excessively using energy, activity of the reducing denitration action in the denitration treatment can be promoted.

In the illustrated example, the combustion gas (e) is supplied between the preliminary process 3 and the denitration treatment process 2, but the combustion gas (e) may be supplied to the upstream side of the preliminary process 3. By supplying it to the upstream of the preliminary process 3, the temperature of the exhaust gas is raised, and efficiency of the oxidation treatment can be improved.

In the denitration method of the present invention, the exhaust gas to be treated is not particularly limited but it may be an exhaust gas from diesel engines for ships and power generation, exhaust gas from diesel engines for automobiles, boiler exhaust gas or plant off-gas. The exhaust gas contains hazardous substances such as particulate matter, sulfur oxides and the like other than the nitrogen oxides, and the particulate matter is often contained mainly in the form of soot and the sulfur oxides mainly as sulfur dioxide. The concentration of the sulfur oxides in the exhaust gas is preferably 50 ppm or more, more preferably 100 ppm or more, or particularly preferably 500 ppm or more. In this concentration range, the validity of the present invention becomes more remarkable.

The exhaust gas from the diesel engines for ships and power generation has relatively low temperature, and application of non-catalyst denitration method as it is has been difficult. However, the denitration method of the present invention is capable of treatment of such an exhaust gas without heating/temperature rise treatment with a purpose of improving the denitration efficiency. Moreover, the denitration is possible with a high efficiency. The temperature of the exhaust gas is preferably 200 to 450° C., more preferably 250 to 450° C. or particularly preferably 250 to 300° C. Even at this low temperature, sufficient denitration effect can be obtained.

The fuel for the diesel engine is not particularly limited but light oil, Bunker A, Bunker C, DME or the like may be used. In order to make use of the characteristic of the denitration method of the present invention, fuel containing sulfur is preferably used, and it may be Bunker A or Bunker C. The Bunker A is specified as containing sulfur of 0.5 mass % or less for No. 1 for Category 1, sulfur of 2.0 mass % or less for No. 2 for Category 1, and the Bunker C is specified as containing sulfur of 3.5 mass % or less for No. 1, Category 3 in the JIS standard (JIS K 2205). Among them, the bunker A used for the diesel engines for ships, diesel generator and the like contains sulfur of 0.2 mass % or less and the Bunker C mainly contains sulfur of 3.5 mass % or less.

The denitration method of the present invention preferably has the final denitration rate of 60% or more, or more preferably 65% or more. In the conventional non-catalyst denitration method, high denitration efficiency can be obtained only for the high-temperature nitrogen oxides at 900 to 1000° C. On the contrary, the method of the present invention can improve the final denitration rate without giving treatment such as heating of the exhaust gas to an exhaust gas at a low temperature.

The present invention will be described below in more detail by means of embodiments, but the scope of the present invention is not limited by these embodiments.

EXAMPLES

Figure 18:
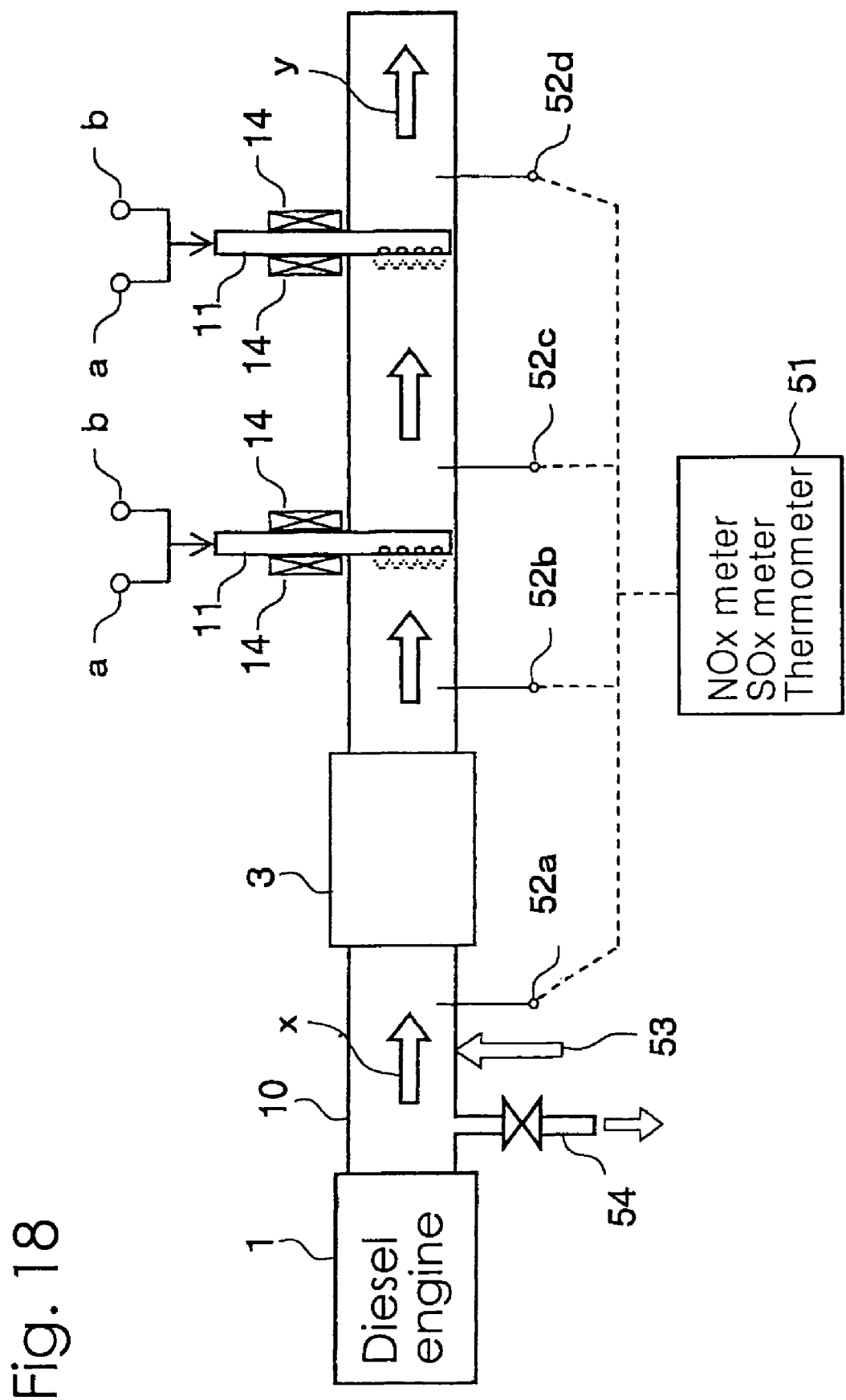
FIG. 18 is an explanatory diagram illustrating an outline of a test apparatus used in an example of the present invention.

On a common condition that the exhaust gas drawn from the diesel engine 1 to the flue 10 (inner diameter: 25 mm) and a bypass line 54 has NO concentration of 600 ppm, $NO_2$ concentration of 0 ppm and the exhaust gas temperature at 250° C. for the denitration treatment of the exhaust gas, nitrogen oxide concentration of each treatment process is measured depending on presence or absence of the preliminary process 3, type of the preliminary process 3 when it is present, and presence of the second denitration treatment process with the same apparatus configuration as shown in reference numerals in Table 1 in a test apparatus in FIG. 18.

In FIG. 18, an electric heater is used as the heating means 14, a measurement point 52a on the upstream of the preliminary process 3 along the flue 10, a measurement point 52b between the preliminary process 3 and the first denitration treatment, a measurement point 52c on the downstream of the first denitration treatment, and a point 52d on the downstream of the second denitration treatment are provided with an NOx meter, an $SO_2$ meter and a thermometer 51 connected, and the nitrogen oxide concentration, sulfur dioxide concentration and gas temperature are measured at each measurement point. As mentioned above, the exhaust gas has NO concentration of 600 ppm, $NO_2$ concentration of 0 ppm and the exhaust gas temperature at 250° C. at the measurement point 52a.

Example 1

Propane and ammonia at a temperature of 900° C. is supplied from the injection port (25 pieces of injection ports with a diameter of 1 mm are arranged in five rows toward the upstream in the flue) formed on the side face of the injection pipe 11 (outer diameter: 10 mm) of the denitration treatment, and denitration treatment of the exhaust gas is carried out in a form without operation of the preliminary process. The obtained result is shown in Table 1.

TABLE 1

|  | Example 1 | Example 2 | Example 3 | Example 4 | Example 5 | Example 6 | Example 7 | Comparative Example 1 |
|---|---|---|---|---|---|---|---|---|
| Apparatus configuration | FIG. 1 | FIG. 7 | FIG. 8 | FIG. 8 | FIG. 9 | FIG. 10 | FIG. 9 | FIG. 19 |
| Exhaust gas temperature [° C.] | 250 | 250 | 250 | 250 | 250 | 250 | 250 | 250 |
| NOx concentration of exhaust gas [ppm] | 600 | 600 | 600 | 600 | 600 | 600 | 600 | 600 |
| $SO_2$ concentration of exhaust gas [ppm] | 0 | 0 | 0 | 0 | 0 | 0 | 260 | 0 |
| Preliminary process | None | None | Plasma | Oxidation catalyst | Gas blowing-in | Gas blowing-in | Gas blowing-in | None |
| Denitration process | Gas blowing-in | Gas blowing-in | Gas blowing-in | Gas blowing-in | Gas blowing-in | Gas blowing-in | Gas blowing-in | Burner |
| Number of denitration process [times] | 1 time | 2 times | 1 time | 1 time | 1 time | 2 times | 1 time | 1 time |
| Measurement point | 52c | 52d | 52c | 52c | 52c | 52d | 52c | 52c |
| NOx concentration of treated gas [ppm] | 390 | 270 | 310 | 320 | 305 | 180 | 220 | 414 |
| Denitration rate [%] | 35 | 54 | 48 | 46 | 49 | 70 | 64 | 31 |

Example 2

Except that the process of the same denitration treatment as in the Example 1 is provided in two stages, the denitration treatment is carried out similarly to the Example 1. The obtained result is shown in Table 1.

Example 3

Except that a plasma treatment apparatus is provided as the preliminary process 3 on the upstream side of the denitration treatment and operated, the denitration treatment is carried out similarly to the Example 1. The obtained result is shown in Table 1. The oxidation rate Nc of nitrogen monoxide at the measurement point 52*b* is 42%.

Example 4

Except that an oxidation catalyst treatment apparatus is provided and operated as the preliminary process 3, the denitration treatment is carried out similarly to the Example 1. The obtained result is shown in Table 1. The oxidation rate Nc of nitrogen monoxide at the measurement point 52*b* is 40%.

Example 5

Except that n-hexane at a temperature of 600° C. is supplied as the preliminary process 3, the denitration treatment is carried out similarly to the Example 1. The obtained result is shown in Table 1. The oxidation rate Nc of nitrogen monoxide at the measurement point 52*b* is 44%.

Example 6

Except that the process of denitration treatment in two stages is provided on the downstream of the preliminary process 3 in the Example 5, the denitration treatment is carried out similarly to the Example 5. The obtained result is shown in Table 1. The oxidation rate Nc of nitrogen monoxide at the measurement point 52*b* is 42%.

Example 7

Except that $SO_2$ is introduced from an $SO_2$ filler portion 53 so that the $SO_2$ concentration becomes 260 ppm, the denitration treatment is carried out similarly to the Example 5. The obtained result is shown in Table 1. The oxidation rate Nc of nitrogen monoxide at the measurement point 52*b* is 40%, the ratio Sc/Nc of the oxidation rate of sulfur dioxide to Nc is 0.08, and the $SO_2$ concentration at the measurement point 52*c* is 250 ppm.

From the results of the Example 7, it is found that the denitration rate is rarely lowered even if being applied to the exhaust gas in which $SO_2$ is present.

Comparative Example 1

As the denitration treatment apparatus, a test apparatus shown in FIG. 19 is used. A burner 41 is arranged in a pipe 40 communicating with the flue 10, the nitrogen compound (a) and hydrocarbons (b) are blown into a high-temperature region 43 formed by a flame 42 of the burner 41 so as to generate amine radical, the amine radical is supplied to the flue, and the nitrogen oxide in the exhaust gas (x) is denitrated. With the NO concentration of 600 ppm, $NO_2$ concentration of 0 ppm and exhaust gas temperature of 250° C. in the exhaust gas (x), the concentration of the nitrogen oxide in the treated gas (y) having been denitrated is measured and the denitration rate is measured. The obtained result is shown in Table 1.

What is claimed is:

1. A method of denitration of exhaust gas flowing in an exhaust gas flue that reductively removes nitrogen oxide in the exhaust gas, comprising:

providing an injection pipe projecting into said exhaust gas flue, injecting a hydrocarbon compound and nitrogen compound into the flue through the injection pipe in a direction countercurrent to the flow of the exhaust gas and forming a combustion region for said hydrocarbon compound in said flue, generating an amine radical from said nitrogen compound in the combustion region, and mixing the nitrogen oxide in said exhaust gas with the amine radical, and denitrating the exhaust gas.

2. The method of denitration of exhaust gas according to claim 1, wherein the temperature of said combustion region is at 600 to 1000° C.

3. The method of denitration of exhaust gas according to claim 1, wherein temperatures of the hydrocarbon compound and nitrogen compound supplied to the process of said denitration treatment are raised in advance by heating means.

4. The method of denitration of exhaust gas according to claim 1, wherein the temperatures of the hydrocarbon compound and nitrogen compound supplied to the process of said denitration treatment are at 600° C. or above.

5. The method of denitration of exhaust gas according to claim 1, wherein the denitrated exhaust gas discharged from the process of said denitration treatment is further mixed with an amine radical and further denitrated.

6. The method of denitration of exhaust gas according to claim 5, wherein the step of mixing said denitrated exhaust gas with said amine radical is executed twice or more.

7. The method of denitration of exhaust gas according to claim 1, further comprising, as a preliminary step, oxidizing a part of nitrogen monoxide in the exhaust gas flowing in said exhaust gas flue so as to generate nitrogen dioxide.

8. The method of denitration of exhaust gas according to claim 7, wherein in said preliminary step, said exhaust gas is contacted with oxidation catalyst or irradiated with plasma so as to oxidize said nitrogen monoxide to nitrogen dioxide.

9. The method of denitration of exhaust gas according to claim 8, wherein said oxidation catalyst is a catalyst in which active metal is carried by a carrier containing titanium and the active metal is at least one compound selected from the group consisting of vanadium compounds, niobium compounds, molybdenum compounds, and tungsten compounds.

10. The method of denitration of exhaust gas according to claim 7, wherein in said preliminary step, a hydrocarbon compound with a carbon number of 5 or more heated to a temperature of 500 to 700° C. is supplied into said exhaust gas flue.

11. The method of denitration of exhaust gas according to claim 10, wherein said hydrocarbon compound with a carbon number of 5 or more has an ignition point at 300° C. or less.

12. The method of denitration of exhaust gas according to claim 10, wherein said hydrocarbon compound with a carbon number of 5 or more is at least one selected from the group consisting of n-hexane, n-octane, n-dodecane, kerosene, and light oil.

13. The method of denitration of exhaust gas according to claim 10, wherein in said preliminary step, the nitrogen compound is supplied together with the hydrocarbon compound with a carbon number of 5 or more.

14. The method of denitration of exhaust gas according to claim 10, wherein in said preliminary step, a preliminary injection pipe projecting into said exhaust gas flue is provided upstream of said injection pipe with respect to the flow of the exhaust gas and said hydrocarbon compound with a carbon number of 5 or more or said hydrocarbon compound and nitrogen compound are supplied from a injection port formed in the preliminary injection pipe.

15. The method of denitration of exhaust gas according to claim 14, wherein said hydrocarbon compound with a carbon number of 5 or more and nitrogen compound supplied to said preliminary process are temperature-controlled by heating means arranged on said preliminary injection pipe outside said exhaust gas flue.

16. The method of denitration of exhaust gas according to claim 7, wherein in said preliminary step, a ratio Sc/Nc of the oxidation rate Sc of sulfur dioxide to the oxidation rate Nc of nitrogen monoxide is 0.01 to 0.2.

17. The method of denitration of exhaust gas according to claim 3, wherein said heating means heats said hydrocarbon compound and nitrogen compound using combustion gas and said combustion gas is supplied into said exhaust gas flue from a combustion gas introduction path integrally attached to said injection pipe so as to maintain the temperatures of said hydrocarbon compound and nitrogen compound.

18. The method of denitration of exhaust gas according to claim 3, wherein said heating means heats said hydrocarbon compound and nitrogen compound using combustion gas and said combustion gas is supplied to said exhaust gas flue upstream of said injection pipe and used for heating of the exhaust gas.

* * * * *